(12) United States Patent
Butler et al.

(10) Patent No.: US 11,936,499 B2
(45) Date of Patent: *Mar. 19, 2024

(54) CAPABILITIES BASED MANAGEMENT OF VIRTUAL AREAS

(71) Applicant: Sococo, Inc., Austin, TX (US)

(72) Inventors: Robert J. Butler, Kirkland, WA (US); Matthew Leacock, Sunnyvale, CA (US); David Van Wie, Eugene, OR (US); Paul J. Brody, Palo Alto, CA (US); F. Randall Farmer, Palo Alto, CA (US)

(73) Assignee: Sococo, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,887

(22) Filed: Jul. 6, 2021

(65) Prior Publication Data

US 2021/0399922 A1 Dec. 23, 2021

Related U.S. Application Data

(63) Continuation of application No. 16/734,278, filed on Jan. 3, 2020, now Pat. No. 11,088,870, which is a (Continued)

(51) Int. Cl.
*H04L 12/46* (2006.01)
*A63F 13/79* (2014.01)
(Continued)

(52) U.S. Cl.
CPC .......... *H04L 12/4641* (2013.01); *A63F 13/79* (2014.09); *G06Q 10/101* (2013.01); *H04L 51/043* (2013.01); *H04L 67/131* (2022.05)

(58) Field of Classification Search
CPC ..... A63F 13/79; H04L 67/131; H04L 51/043; H04L 12/4641; H04L 67/38; G06Q 10/101
See application file for complete search history.

(56) References Cited

U.S. PATENT DOCUMENTS 8,116,323 B1 * 2/2012 Evans ..................... A63F 13/79
370/400
8,510,806 B2 * 8/2013 Queck ................. G06F 21/6209
713/193

(Continued)

OTHER PUBLICATIONS

Notice of Allowance dated Apr. 6, 2021, filed in U.S. Appl. No. 16/734,278, pp. 1-4.

(Continued)

*Primary Examiner* — Abdullahi E Salad

(57) ABSTRACT

Apparatus and methods of managing a virtual area based on communicant capabilities are described. The communicant capabilities are updated based on rules in response to events in the virtual area. An action by one communicant can affect the capabilities of another communicant. Communicant capabilities can be stored in respective server-side proxies and the virtual area can be managed without transmitting any of the capabilities to the communicants' client network nodes. Capability-based permissions checks can be performed against communicant capabilities with wildcarded attribute fields.

32 Claims, 11 Drawing Sheets

Related U.S. Application Data continuation of application No. 16/198,516, filed on Nov. 21, 2018, now Pat. No. 10,567,199, which is a continuation of application No. 15/091,500, filed on Apr. 5, 2016, now Pat. No. 10,148,457, which is a continuation of application No. 13/604,360, filed on Sep. 5, 2012, now abandoned.

(60) Provisional application No. 61/535,910, filed on Sep. 16, 2011.

(51) Int. Cl.
*G06Q 10/10* (2023.01)
*G06Q 10/101* (2023.01)
*H04L 29/06* (2006.01)
*H04L 51/043* (2022.01)
*H04L 67/131* (2022.01)

(56) References Cited

U.S. PATENT DOCUMENTS

| | | | | |
|---|---|---|---|---|
| 2007/0198696 | A1* | 8/2007 | Morris | G06Q 10/00 709/224 |
| 2009/0254842 | A1* | 10/2009 | Leacock | G06F 3/04815 715/757 |
| 2009/0254843 | A1* | 10/2009 | Van Wie | H04L 67/131 707/999.005 |
| 2009/0309891 | A1* | 12/2009 | Karkanias | A63F 13/79 345/581 |

OTHER PUBLICATIONS

Examiner Interview Summary Record dated Apr. 6, 2021, filed in U.S. Appl. No. 16/734,278, p. 1.
Terminal Disclaimer filed Mar. 25, 2021, filed in U.S. Appl. No. 16/734,278, pp. 1-2.
Terminal Disclaimer approved Mar. 25, 2021, filed in U.S. Appl. No. 16/734,278, p. 1.
Response to Non-Final Office Action dated Mar. 3, 2021, filed in U.S. Appl. No. 16/734,278, pp. 1-6.
Non-Final Office Action dated Sep. 3, 2020, filed in U.S. Appl. No. 16/734,278, pp. 1-6.

* cited by examiner

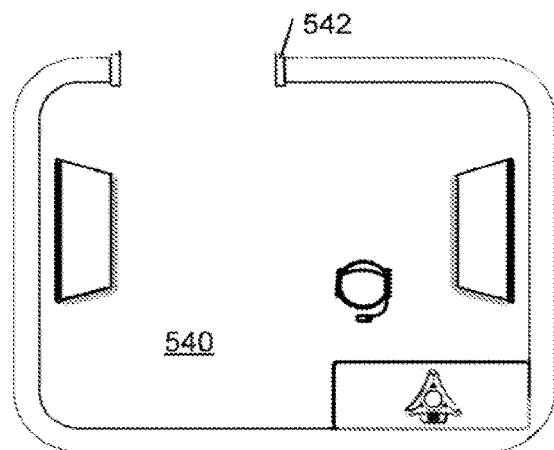
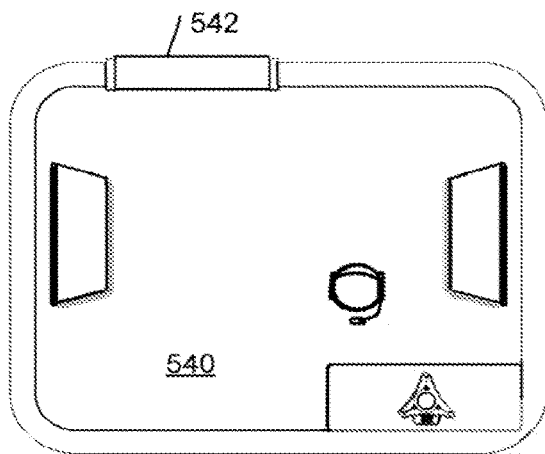
FIG. 13A    FIG. 13B
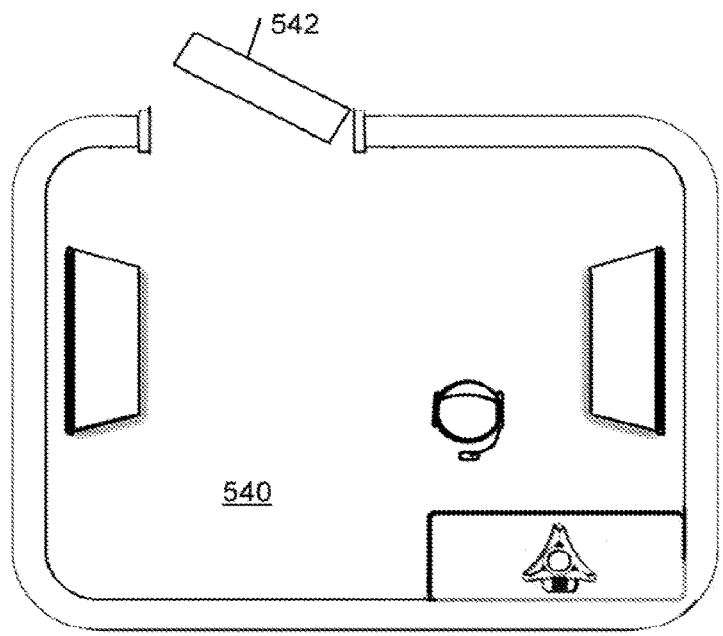
FIG. 13C

CAPABILITIES BASED MANAGEMENT OF VIRTUAL AREAS

CROSS-REFERENCE TO RELATED APPLICATIONS

Under 35 U.S.C. § 119(e), this application claims the benefit of U.S. Provisional Application No. 61/535,910, filed Sep. 16, 2011, the entirety of which is incorporated herein by reference.

This application also relates to the following patent applications, the entirety of each of which is incorporated herein by reference: U.S. patent application Ser. No. 12/825,512, filed Jun. 29, 2010; U.S. patent application Ser. No. 12/354,709, filed Jan. 15, 2009; U.S. patent application Ser. No. 12/418,270, filed Apr. 3, 2009; U.S. patent application Ser. No. 13/165,729, filed Jun. 21, 2011; U.S. patent application Ser. No. 13/209,812, filed Aug. 15, 2011; and U.S. patent application Ser. No. 13/399,737, filed Feb. 17, 2012.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

7 is a flow diagram of an example of a method of managing and using capabilities in connection with a virtual area.

Figure 8:
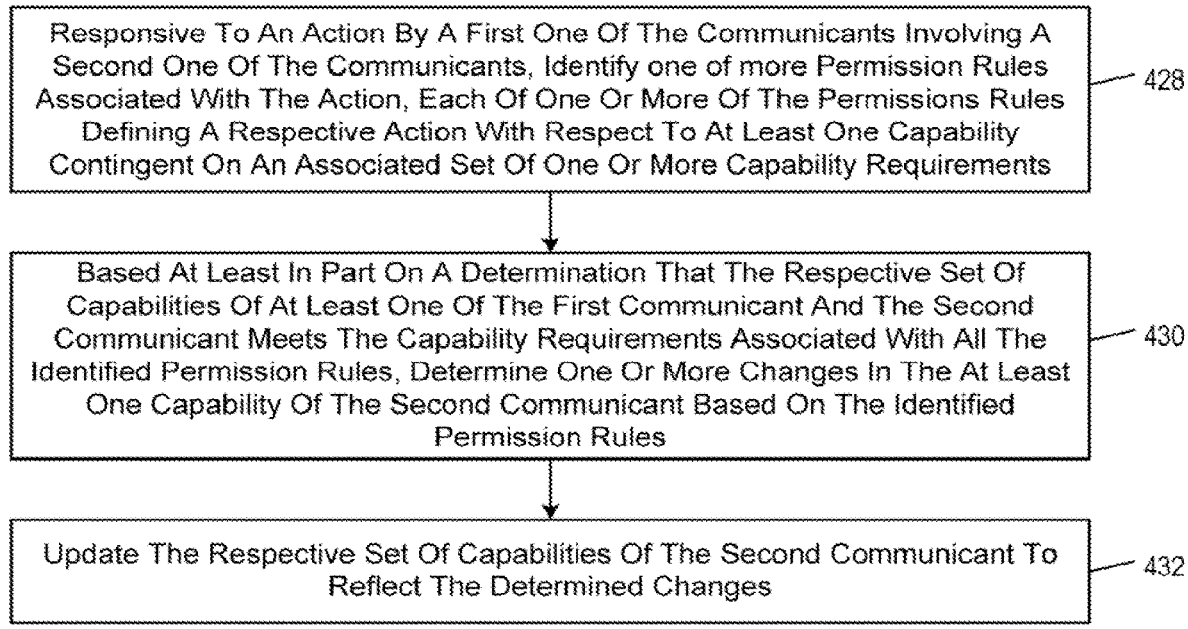

FIG. 8 is a flow diagram of an example of a method of changing capabilities in connection with a virtual area.

Figure 9:
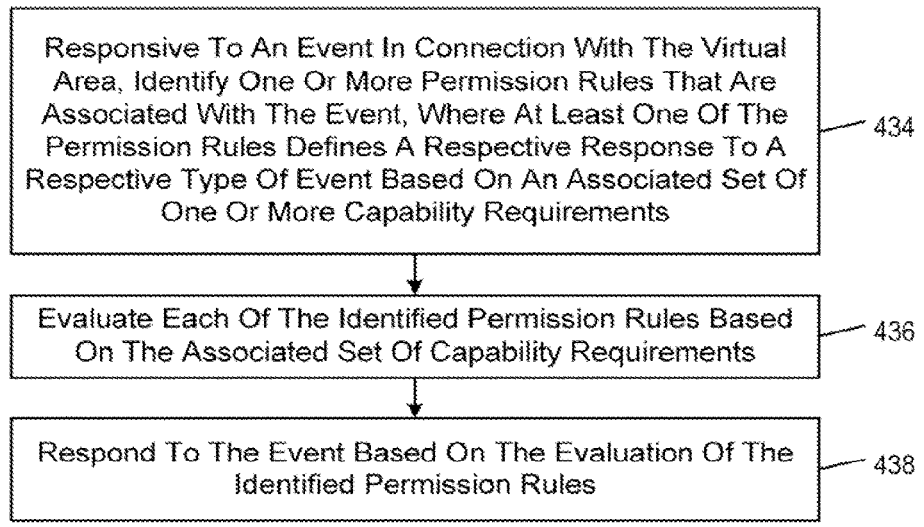

FIG. 9 is a flow diagram of an example of a capabilities based method of managing a virtual area.

Figure 10:
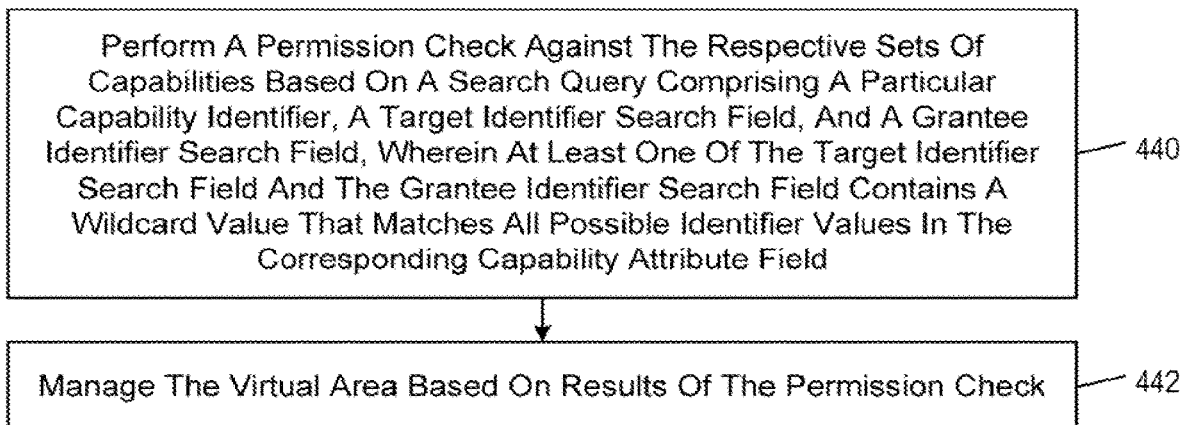

FIG. 10 is a flow diagram of an example of a method of performing capabilities based permissions checks.

Figure 11:
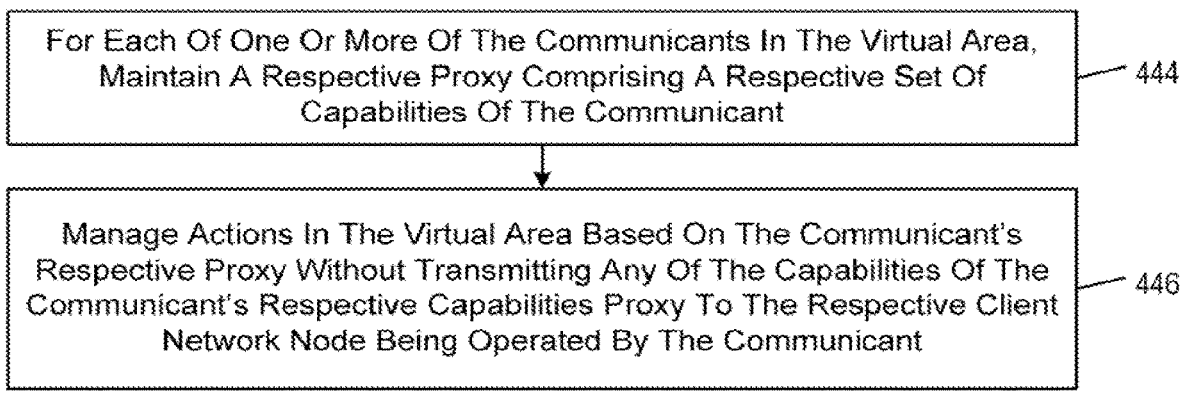

FIG. 11 is a flow diagram of an example of a capabilities based method of managing a virtual area.

Figure 12A:
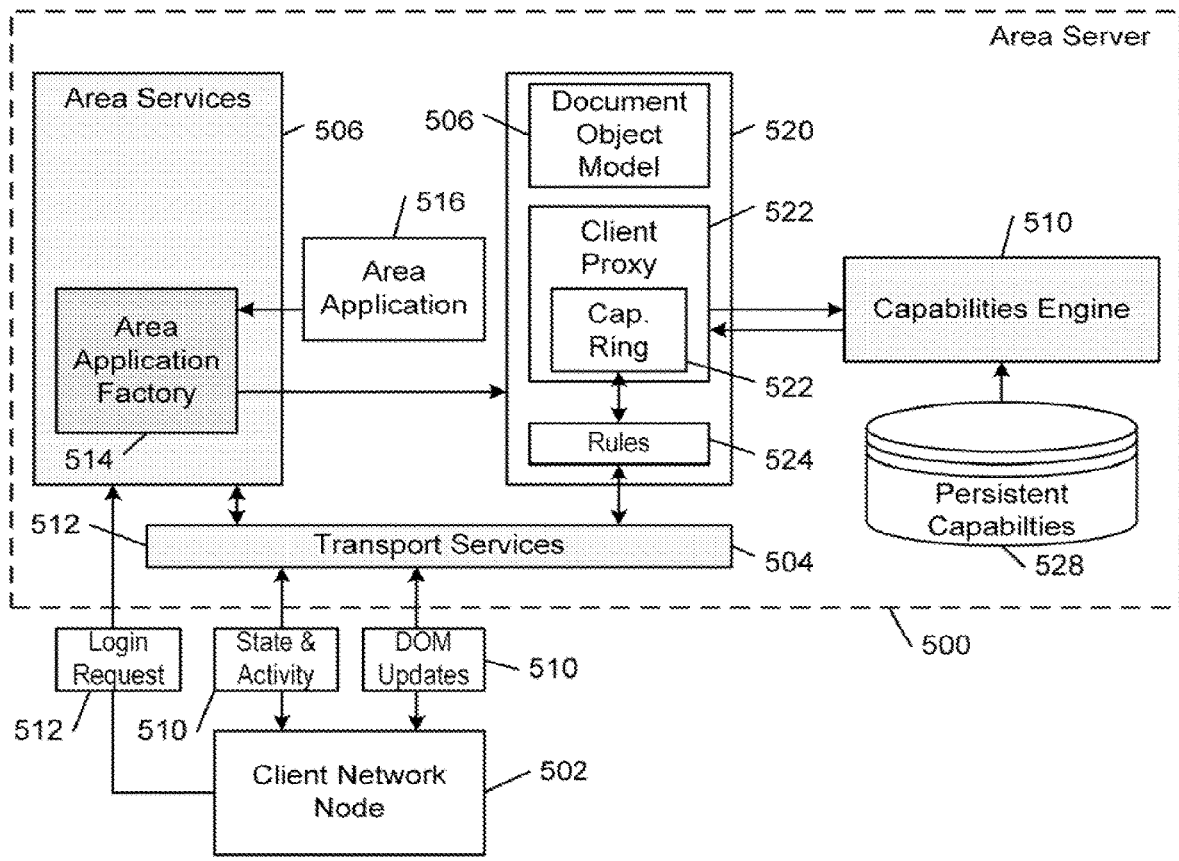

FIG. 12A is a block diagram of an example of an area server and a client network node.

Figure 12B:
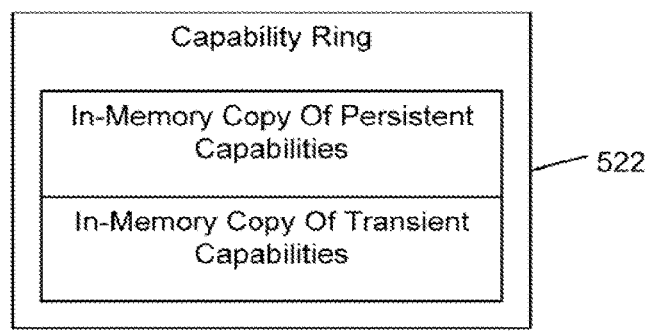

FIG. 12B is a diagrammatic view of an example of a capability ring.

FIGS. 13A-13O are plan views of an example of a virtual area room zone with a door in different respective states.

Figure 14:
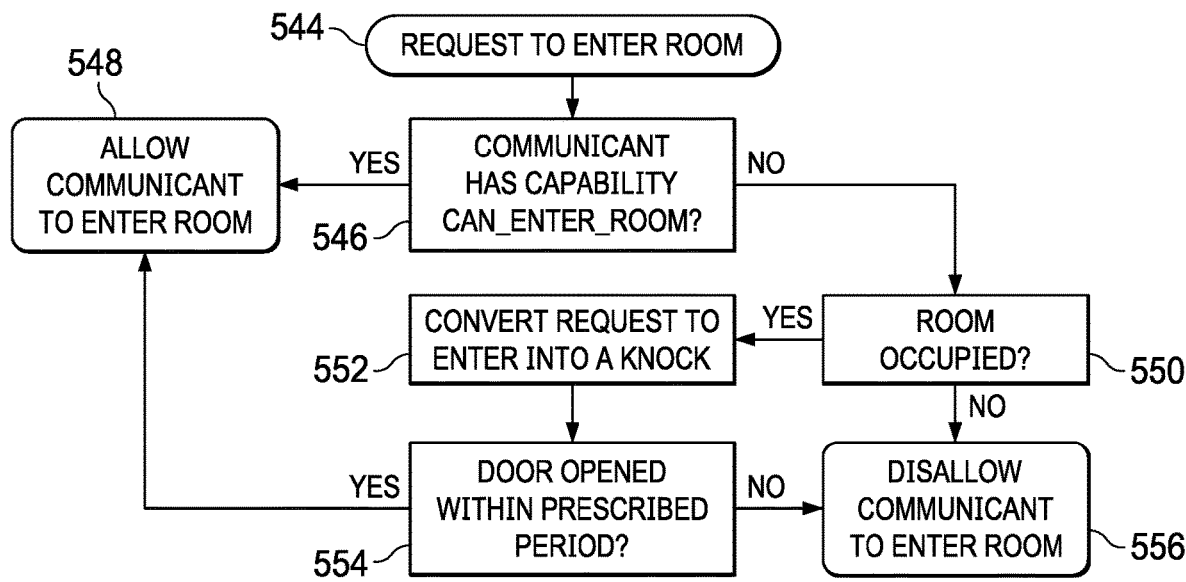

FIG. 14 is a flow diagram of an example of a method of administering access to a virtual area room zone with a closed door.

Figure 15A:
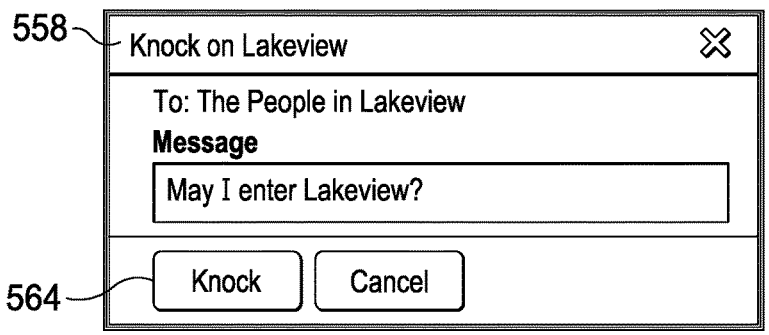
Figure 15B:
Figure 15C:
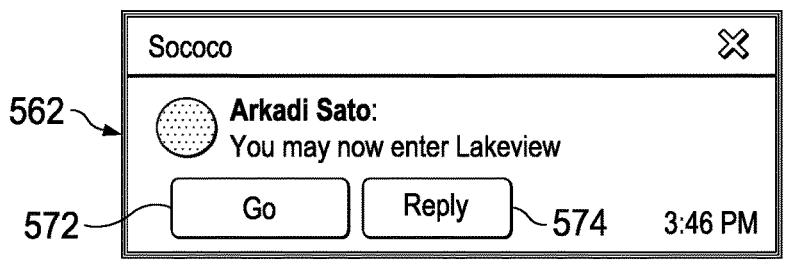

FIGS. 15A-15C are diagrammatic views of examples of dialog boxes relating to a method of gaining access to a virtual area room zone with a closed door.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

Synchronous conferencing refers to communications in which communicants participate at the same time. Synchronous conferencing encompasses all types of networked collaboration technologies, including instant messaging (e.g., text chat), audio conferencing, video conferencing, file sharing, and file sharing technologies.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual area communications application" is a client communications application that integrates realtime audio communications (and potentially other realtime communications, e.g., video, chat, and realtime other data stream) with visual presentations of interactions in a virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

As used herein, the term "includes" means includes but not limited to, the term "including" means including but not limited to. The term "based on" means based at least in part on.

II. CAPABILITIES BASED MANAGEMENT OF VIRTUAL AREAS

The examples that are described herein include capabilities based management systems that support the creation of a wide variety of virtual area configurations that can define capability rules and permission rules in terms of communicant capabilities at a highly granular level to provide highly customizable virtual area based realtime communication environments.

Figure 1:
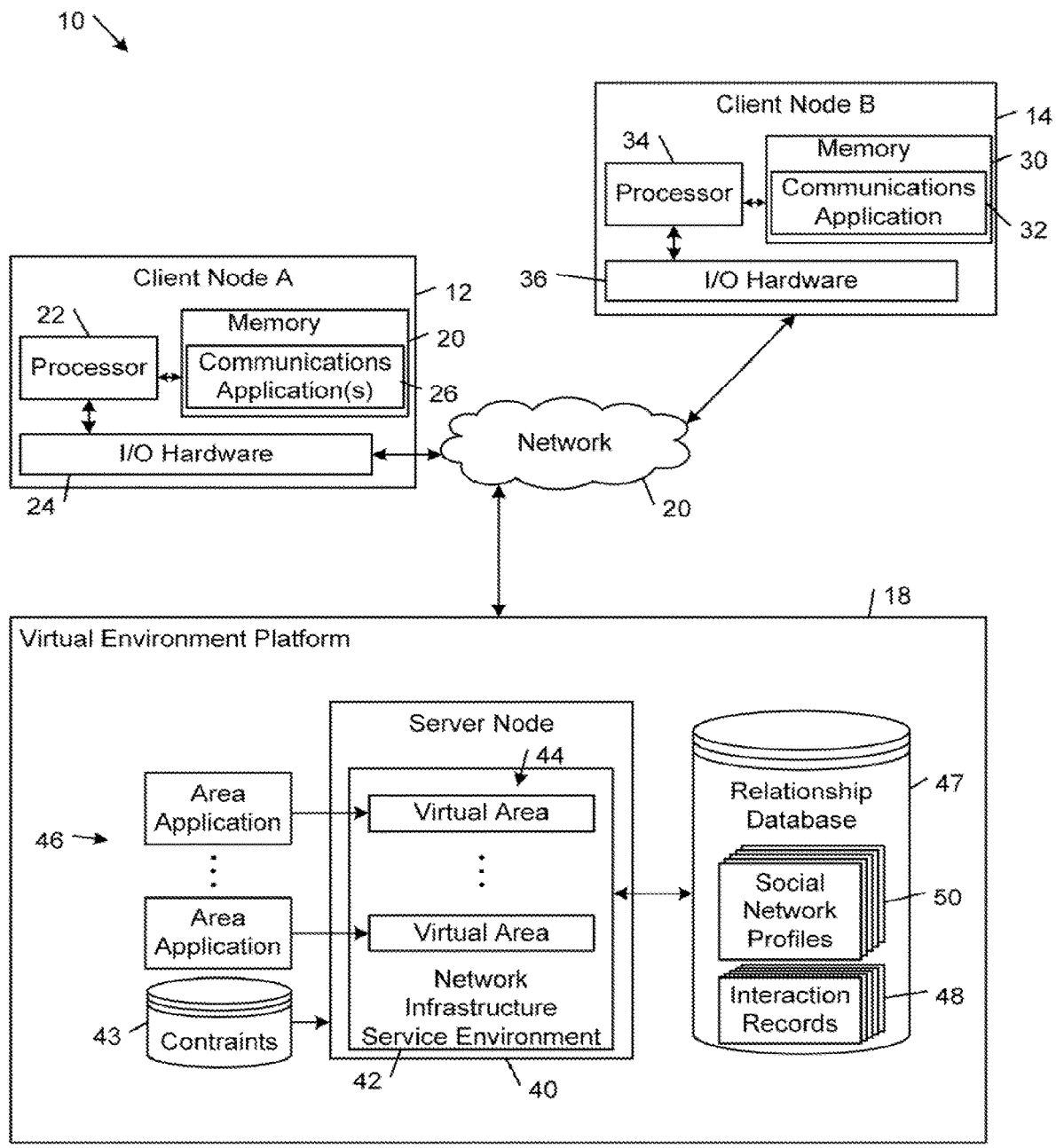
FIG. 1 is a diagrammatic view of an example of a network communications environment that includes first and second client network nodes and a communications environment that includes first and second client network nodes and a virtual environment platform that includes at least one server network node.

FIG. 1 shows an example of a network communications environment 10 that includes a first client network node 12 (Client Node A), a second client network node 14 (Client Network Node B), and a virtual environment platform 18 that are interconnected by a network 20. The network 20 may include one or more of any of a local area network (LAN), a metropolitan area network (MAN), and a wide area network (WAN) (e.g., the Internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including a display). The processor 24 executes at least one communications application 26 that is stored in the memory 22. The second client network node 14 typically is configured in substantially the same general way as the first client network node 12, with a computer-readable medium 30 storing at least one communications application 32, a processor 34, and input/output (I/O) hardware 36 (including a display). Each of the network nodes 12, 14 has a respective set of one or more sources and an exemplary set of one or more sinks. Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

In the illustrated embodiment, the virtual environment platform 18 includes at least one server network node 40 that provides a network infrastructure service environment 42 that manages sessions of the first and second client nodes 12, 14 in one or more virtual areas 44 in accordance with respective virtual area applications 46. Each of the virtual area applications 46 is hosted by a respective one of the virtual areas 44 and includes a description of the respective virtual area 44. Communicants respectively operating the client nodes 12, 14 connect to the area applications 46 through the communications applications 26, 32.

The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the exemplary embodiment of the network infrastructure service environment 42 are an account service, a security service, an area service, a rendezvous service, an interaction service, and a capabilities engine.

The account service manages communicant accounts for the virtual environment. The account service also manages the creation and issuance of authentication tokens that can be used by client network nodes to authenticate themselves to any of the network infrastructure services.

The security service controls communicants' access to the assets and other resources of the virtual environment based on one or more of capabilities (where access is granted to entities having proper capabilities or permissions) that are maintained by the capabilities engine. After a particular communicant has been granted access to a resource, that communicant typically uses the functionality provided by the other network infrastructure services to interact in the network communications environment 300.

The area service administers virtual areas. In some embodiments, the area service remotely configures the communications applications 26, 32 operating the first and second client network nodes 12, 14 in accordance with the virtual area application 46 subject to the constraints 43, which typically include controls on access to the virtual area that are based on one or more of capabilities (where access is granted to communicants or client nodes having proper capabilities or permissions) that are maintained by the capabilities system.

The area service also manages network connections that are associated with the virtual area subject to the capabilities of the requesting entities, maintains global state information for the virtual area, and serves as a data server for the client network nodes participating in a shared communication session in a context defined by the virtual area 44. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 44 on the client network node in accordance with the virtual area application 46. The area service also ensures that the client network nodes can synchronize to a global state if a communications fault occurs. The area service typically manages communicant interactions with virtual areas via governance rules that are associated with the virtual areas.

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

The interaction service maintains the relationship database 47 that contains the records 48 of interactions between communicants and social network profiles 50 that are associated with respective communicants. For every interaction between communicants, one or more services of the network infrastructure service environment 42 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

The interaction service also supports queries on the relationship database 47 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database 47 can be combined with other searches. For example, queries on the relationship database may be combined with queries on contact history data generated for interactions with contacts using a communication system (e.g., Skype, Facebook, and Flickr) that is outside the domain of the network infrastructure service environment 42.

The structure, operation, and components of an exemplary embodiment of a network infrastructure service environment are described in U.S. patent application Ser. No. 12/825,512, filed Jun. 29, 2010, the entirety of which is incorporated herein by reference.

The communications applications 26, 32, the area applications 46, and the network infrastructure service environment 42 together provide a platform that administers the realtime connections with network nodes in a communication context that is defined by an instance of a virtual area subject to a set of constraints 43 that control access to the virtual area instance. The communications applications 26, 32 operating the first and second client network nodes 12, 14 present respective views of the virtual areas 44 in accordance with data received from the network infrastructure service environment 42 and provide respective interfaces for receiving commands from the communicants and providing a spatial interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some embodiments, the communications applications 26, 32 establish realtime data stream connections between the first and second client network nodes 12, 14 and other network nodes sharing the virtual area 44 based on the positions of the communicants' avatars in the virtual areas 44.

Figure 2:
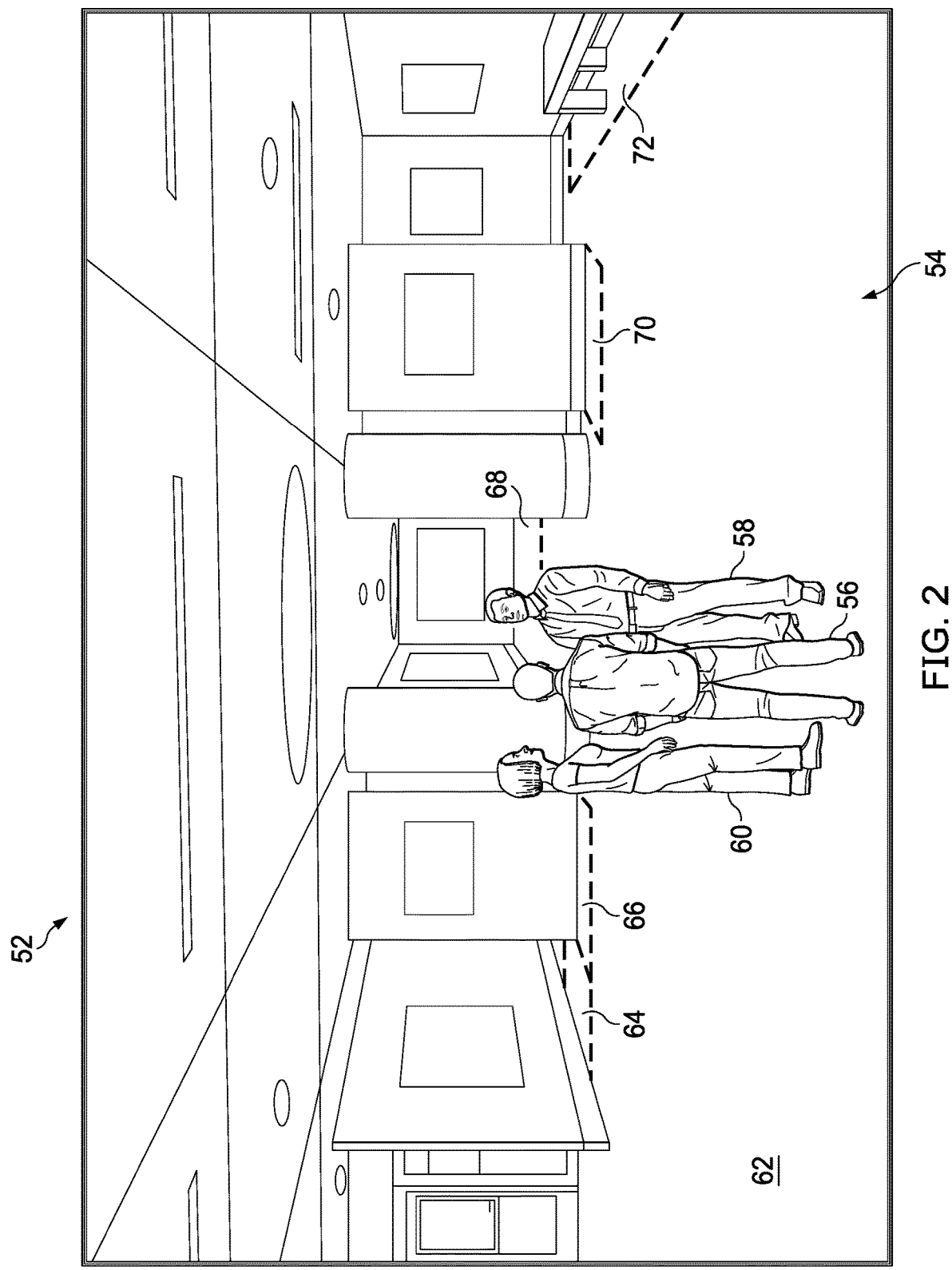
FIG. 2 is a diagrammatic view of an example of a graphical user interface showing a perspective view of a virtual area that includes zones that are associated with respective real-time data stream switching rules.

FIG. 2 shows an example of a graphical user interface 52 that presents a two-dimensional depiction of a shared virtual area 54. Communicants are represented in the virtual area 54 by respective avatars 56, 58, 60, each of which may have a respective role (e.g., a curator, an artist, and a visitor) in the virtual area 66. The virtual area 54 includes zones 62, 64, 66, 68, 70, 72 that are associated with respective rules that govern the switching of realtime data streams between the network nodes that are represented by the avatars 56-60 in the virtual area 54. (During a typical communication session, the dashed lines demarcating the zones 62-72 in FIG. 2 are not visible to the communicants although there may be visual cues associated with such zone boundaries.) The switching rules dictate how local connection processes executing on each of the network nodes establishes communications with the other network nodes based on the locations of the communicants' avatars 56-60 in the zones 62-72 of the virtual area 54.

The network connections between network nodes may be arranged in a variety of different stream handling topologies, including a peer-to-peer architecture, a server-mediated architecture, and hybrid architectures that combine aspects of peer-to-peer and server-mediated architectures.

The communications applications 26, 32 respectively operating the client nodes 12, 14 typically include software and hardware resources which, together with administrative policies, user preferences (including preferences regarding the exportation of the user's presence and the connection of the user to the area applications 46 and other communicants), and other settings, define a local configuration that influences the administration of realtime connections with other network nodes. Among the software components executing on the client network nodes 12, 14 are a user interface component and a browser component. The browser component provides a set of web browsing functions, including browser functions, document viewing functions, and data downloading functions. The user interface component generates a graphical user interface that interfaces the user to the realtime communications and network browsing functionalities of the browser component. The browser component may be integrated into the communications applications 26, 32 or it may be implemented by a separate browser component (e.g., a plug-in) that exposes an API through which the communications applications 26, 32 may call methods that are available from the browser component, including browsing methods, document viewing methods, and data downloading methods.

In some embodiments, the server network node 40 remotely manages client communication sessions and remotely configures audio and graphic rendering engines on the client network nodes 12, 14, as well as switching of data streams by sending instructions (also referred to as definitions) from the remotely hosted area applications 46 to the client network nodes in accordance with the stream transport protocol described in U.S. patent application Ser. No. 12/825,512, filed Jun. 29, 2010, the entirety of which is incorporated herein by reference. In some of these embodiments, the server node(s) 40 send to each of the client nodes 12, 14 provisioning messages that configure the client nodes 12, 14 to interconnect respective data streams between active ones of their complementary sources and sinks in accordance with switching rules specified in the server applications 46.

In some of the examples that are described herein, the virtual areas are of the type disclosed in U.S. Pat. Nos. 7,769,806 and 7,844,724. In these examples, a virtual area is defined by an area application that includes a description of geometric elements of the virtual area and one or more zones, where each of the zones is associated with a respective set of rules, policies, and preferences. The rules may include, for example, switching rules, governance rules, and visibility rules. The switching rules govern realtime stream connections between the network nodes. The governance rules control a communicant's access to resources, such as the virtual area itself, regions with the virtual area, and objects within the virtual area. The visibility rules specify what the types of information that are presented to the communicants based on their respective capabilities, which may be persistent or transient.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

The platform tracks communicants' realtime availabilities and activities across the different communication contexts that are defined by the area applications 46. This information is presented to the communicants in the form of realtime visualizations that enable the communicants to make more informed network interaction decisions (e.g., when to interact with a contact) and encourages the communicants to initiate interactions with other communicants and to join contexts (e.g., an ongoing conversation between communicants) of which the communicants otherwise would not have been aware. In some embodiments, the realtime visualization includes visual cues as to the presence and activities of the communicants in the contexts of the server applications. The presentation of these visual cues typically depends on one or more of governance rules associated with the virtual areas 44, administrative policies, and user preferences (including preferences regarding the exportation of the user's presence and the connection of the user to areas and other communicants), which may define tiered relationship based predicates that control access to presence information and/or resources on a zone-by-zone basis.

A zone may be a rendered location zone or a non-rendered governance zone. Zones are defined in the area application 46. A zone definition typically includes one or more channel definitions that describe how to create respective channels in the zone and specify the information about the channel that is published to a client network node that becomes present in the zone. A channel is always uniquely defined point-to-point and is unique to a user and an area application. For example, each of multiple users may have a realtime data stream (RDS) activity control channel named "!RdsActivityControl," but each of these channels has a unique channel ID.

A zone definition also typically includes definitions of one or more zone managers that specify which area zone managers provide governance and control channels that are used by the zone managers in each zone. A non-rendered governance zone typically encompasses a collection of one or more rendered location zones. One or more control channels are defined within a governance zone. A control channel is a collection of channels that share a common definition that is managed by exactly one area zone manager. A single area zone manager can manage multiple control channels. A governance zone functions as a "sink" for data sent on the associated control channel, whereas a location zone that specifies the same control channel functions as the "source" of the control channel data. A user who is present in any one of the locations zones within a governance zone is also present within the governance zone.

Figure 3:
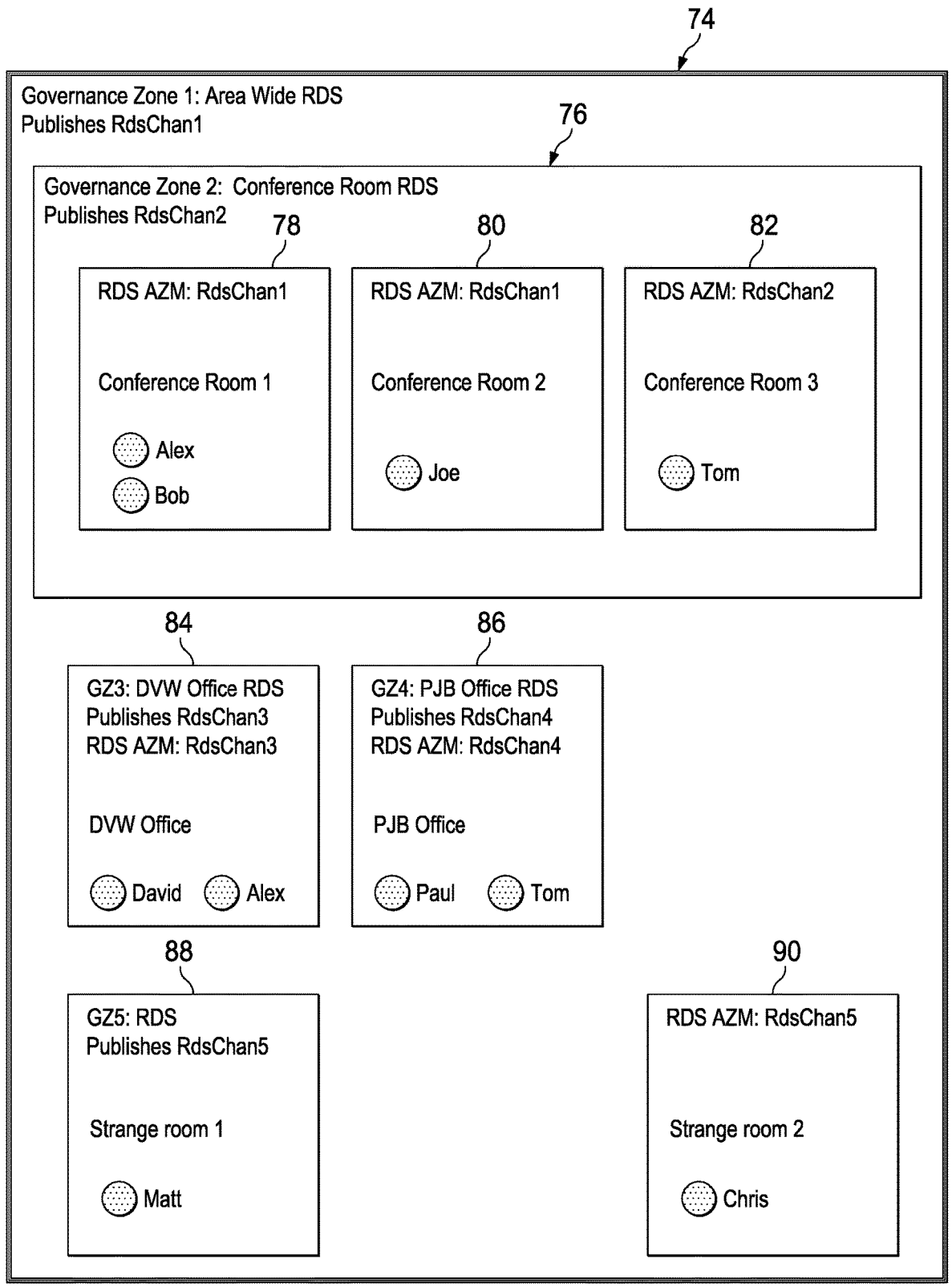
FIG. 3 is a diagrammatic plan view of an example of a spatial layout of governance zones.

FIG. 3 shows an example of a realtime differential stream zone map that defines how RDS streams (e.g., mouse events describing avatar motion, keyboard events describing object interaction, connection events, avatar updates, object state changes, and art definitions) are sourced and sunk in a virtual area. In this example, the virtual area includes seven locations: Conference Room 1, Conference Room 2, Conference Room 3, DVW Office, PJB Office, Strange Room 1, and Strange Room 2. The virtual area also includes five governance zones: a global area wide zone 74, a zone 76 containing all three conference rooms, zones 78, 80, 82, 84, 86 for each office (which coincide with the location zones), and zones 88, 90 for Strange Room 1 and Strange Room 2.

Alex is present in Conference Room 1, GZ1, GZ2 and DVW Office(GZ3), Bob is present in Conference Room 1, GZ1 and GZ2, Joe is present in Conference Room 2, GZ1 and GZ2, Tom is present in Conference Room 2, GZ1, GZ2 and PJB Office/GZ4, David is present in DVW Office/GZ3 and GZ1, Paul is present in PJB Office/GZ4 and GZ1, Matt is present in Strange Room 1/GZ5 and GZ1, and Chris is present in Strange Room 2 and GZ1.

There are five control channels for RDS, one published by each zone except zone 90, which does not publish any RDS data: RDSChan1 is published by zone 74; RdsChan2 is published by zone 76; RdsChan3 is published by zone 84; RdsChan4 is published by zone 86; and RdsChan5 is published by zone 88. RDS activity in a zone is sent out on all RDS AZM control channels for that zone and delivered to all users present in the governance zones that publish those control channels.

In the example shown in FIG. 3, activity in any of conference room 1 or conference room 2 is published on RdsChan1, which is published by an area zone manager for governance zone 74. Since every user in the area is in governance zone 74, all users in the area are subscribed to RdsChan1 and see the RDS activity in Conference Rooms 1 and 2 (governance zones 78, 80). Activity in Conference Room 3 (governance zone 82) is published on RdsChan2 by an area zone manager for governance zone 76. In this case, only Alex, Bob, Joe and Tom are in governance zone 76, so only they are subscribed to the channel and see Tom's Activity in Conference Room 3. Since RdsChan1 is not a control channel for Conference Room 3, activity in Conference Room 3 is not broadcasted on that channel. Activity in the DVW Office is sent out on RdsChan3, which is published by governance zone 84 and therefore is only visible to David and Alex since they are the only ones present in that zone. Likewise, activity in the PJB Office is sent out on RdsChan4, which is published by governance zone 86 and therefore is only visible to Paul and Tom since they are the only ones present in that zone. Activity in Strange Room 1 is not visible anywhere, not even in Strange Room 1 since it doesn't specify an RDS Control Channel. Activity in Strange Room 2 is sent out on RdsChan5, which is published by governance zone 88 and therefore is broadcast to Matt in Strange Room 1. Thus, no one can see Matt's activity in Strange Room 1 (not even Matt) and only Matt can see Chris's activity in Strange Zone 2.

Figure 4:
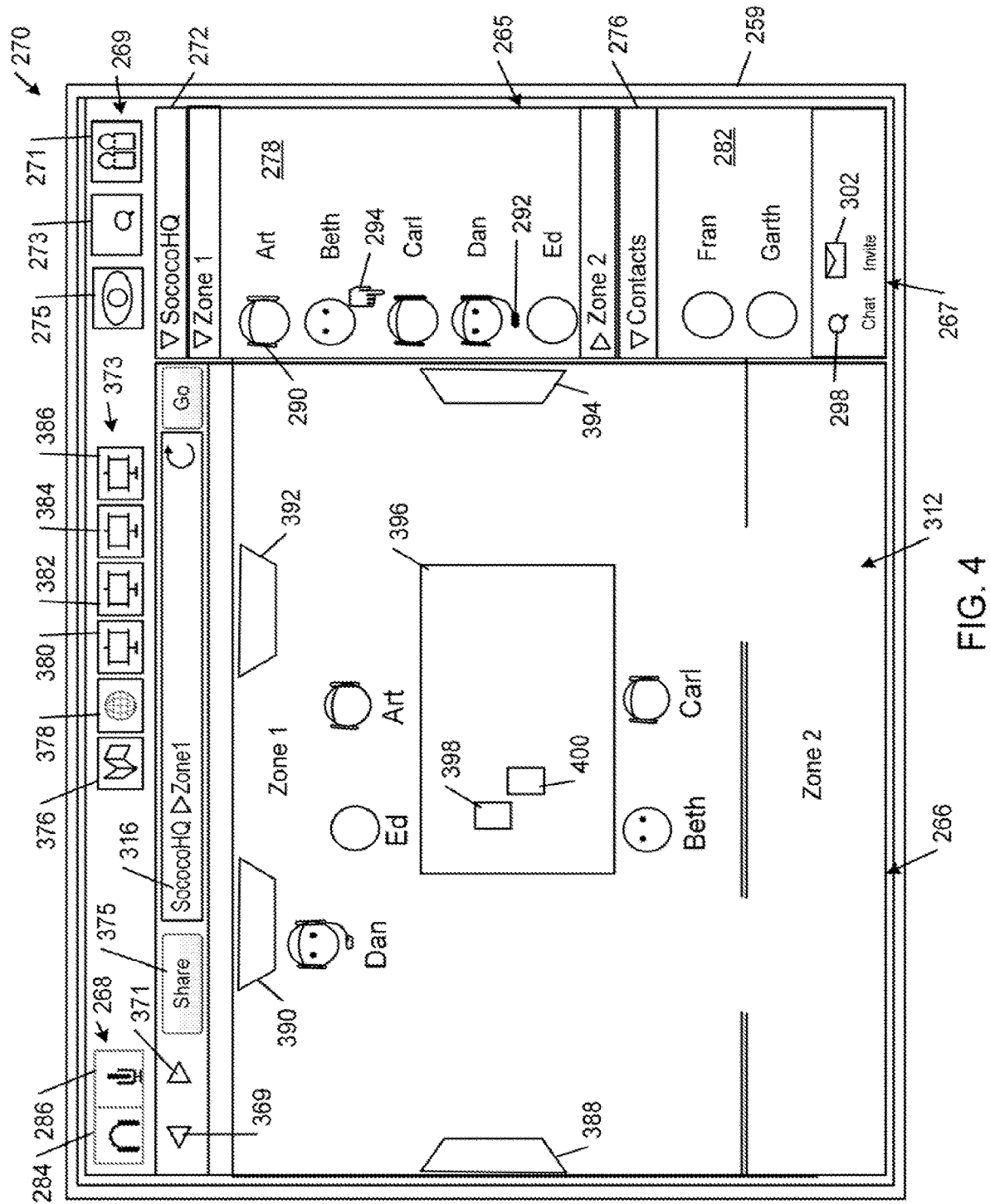
FIGS. 4-5 are diagrammatic views of graphical user interface examples.

FIG. 4 shows an exemplary graphical user interface 270 that is generated by an example of the communications application 26 in a window 259 on a display of the client network node from which a user of the client application ("Art" in this example) is operating. The graphical user interface 270 includes a people panel 265, a viewer panel 266, a people interaction toolbar 267, an audio interaction toolbar 268, and a set of panel view controls 269. The panel view controls 269 include a people panel button 271 for opening and closing the people panel 265, a Chat panel button 273 for opening and closing a Chat panel, and a viewer panel button 275 for opening and closing the viewer panel 266.

The people panel 266 depicts the realtime availabilities and activities of some or all of Art's contacts across different communication contexts. In the example shown in FIG. 4, the people panel 266 shows Art's contacts segmented into a virtual area groups section 278 and a contacts group section 282. The virtual area groups 278 section shows the presence and activity states in each of the area applications 44 of which Art is a member with respect to which at least one of Art and Art's contacts is present, grouped by virtual area application. The contacts group section 280 contains all or a selected portion of Art's contacts that are not represented in any of the virtual area groups. In the illustrated example, the virtual area group section 278 includes a single virtual area group (labeled with a header bar 272 entitled "SococoHQ") that identifies all the communicants who have a presence in the area application "SococoHQ." The contacts group section 280 is labeled with a header bar 276 entitled "Contacts" and identifies all of Art's contacts who are not shown in the virtual area groups section 278 (i.e., they either are not members of or not present in SococoHQ).

In the example shown in FIG. 4, the virtual area groups section 278 contains the graphical representations (avatars) of the communicants (including at least one of Art or Art's contacts) who currently have presence in the respective area applications 44, and the contacts section 282 contains graphical representations (avatars) of all of the remaining ones of Art's contacts who are not present in or not members of SococoHQ. In the illustrated example: Art, Beth Carl, Dan, and Ed are members of the SococoHQ area application; and Fran and Garth are contacts of Art who are not present in SococoHQ.

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 278, 282 is alphabetical by user name. In other embodiments, the spatial positions of the communicant avatars in the area application groups section 278 are ordered in accordance with the temporal ordering of the communicants in terms of the times when the communicants established their respective presences with the server applications. The spatial positions of the communicant avatars in the contacts section 282 may be sorted alphabetically by user name, according to frequency of contact, according to recentness of contact, or according to other sorting or filtering criteria.

The activities of the communicants in the contexts of the area applications 44 may be inferred by the client communications application from the activities on communication channels over which the respective communicants are configured to communicate. The activities on the communication channels are shown in the graphical user interface 270 by visual cues that are depicted in association with the graphical representations of the communicants in the sections 278, 282. For example, the "on" or "off" state of a communicant's local speaker channel is depicted by the presence or absence of a headphones graphic 290 on the communicant's sprite. When the speakers of the communicant who is represented by the sprite are on, the headphones graphic 290 is present (see sprites Art, Carl, and Dan) and, when the communicant's speakers are off, the headphones graphic 290 is absent (see sprites Beth and Ed). The "on" or "off" state of the communicant's microphone is depicted by the presence or absence of a microphone graphic 292 on the communicant's sprite. When the communicant's microphone is on, the microphone graphic 292 is present (see sprite Dan); and, when the communicant's microphone is off, the microphone graphic 292 is absent (see sprites Art, Beth, Carl, and Ed). The headphones graphic 290 and the microphone graphic 292 provide visual cues of the activity states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 294 adjacent the communicant's sprite (see sprite Beth). Thus, when a communicant is transmitting text chat data to another network node the hand graphic 294 is present, and when a communicant is not transmitting text chat data the hand graphic 294 is not present. In some embodiments, text chat data is transmitted only when keyboard keys are depressed, in which case the visualization of the communicant's text channel appears as a flashing on and off of the hand graphic 294.

In the example shown in FIG. 4, members of an area application are able to receive the visual cues of the communicant activities occurring in the contexts defined by the zones of that area application whether or not the members are present in the zone in which the communicant activities are occurring. For example, the graphical user interface 270 that is presented to Art can show visual cues indicating the communication channel activities of the communicants who are present in Zones 1 of the SococoHQ virtual area (where Art is present) and the communication channel activities of the communicants present in other zones of the SococoHQ virtual area (e.g., Zone 2) and other areas of which Art is a member but not currently present.

The audio interaction toolbar 268 includes a headphone control 284 that enables Art to toggle on and off the local speakers of the client network node, and a microphone control 286 that enables Art to toggle on and off the local microphone of the client network node.

Additional details regarding embodiments of the people panel 265 are described in U.S. patent application Ser. No. 13/209,812, filed Aug. 15, 2011, and U.S. patent application Ser. No. 12/354,709, filed Jan. 15, 2009.

The people interaction toolbar 267 includes a Chat button 298 and an Invite button 302. Selection of the Chat button 298 opens a Chat panel 340 (see FIG. 5) that enables Art to initiate a chat with other communicants who are present in the area application where Art is present (i.e., SococoHQ in the illustrated example). Selection of the Invite button 302 opens an Invite window that enables Art to invite one or more communicants to a selected virtual area location (e.g., an area application or zone within that area application). Additional details regarding embodiments of the methods and functions invoked by the Chat button 298 and the Invite button 302 are described in U.S. patent application Ser. No. 12/354,709, filed Jan. 15, 2009, and U.S. patent application Ser. No. 13/209,812, filed Aug. 15, 2011.

In addition to the control and panel elements of the graphical user interface 270 (e.g., the people panel 265, the viewer panel 266, the people interaction toolbar 267, the audio interaction toolbar 268, and the panel view controls 271, 273, 275), the graphical user interface 270 includes a Share button 375 and a set 373 of Viewer Panel control buttons, including a Map button 376, a Browse button 378, and four View Screen buttons 380-386. The Share button 375 initiates a screen share of the contents of the display area 312 of the viewer panel 266 in connection with a view screen prop in a virtual area. These contents include, for example, renderings of any information that is received by the browser component in connection with the network resource identified in the location bar 316, and a document or application that is being shared by the user in connection with a view screen object in a virtual area. The Map button 376 sets the view presented in the viewer panel 266 to a map view of the virtual area. The Browse button 378 sets the view presented in the viewer panel 266 to a browser view. Each of the four View Screen buttons 380-386 sets the viewer panel 266 to display the content the content being shared in connection with a corresponding one of the view screens in the virtual area.

FIG. 4 shows an example of the graphical user interface 270 in the Map view mode presenting in the viewer panel 266 a rendered view of a zone (Zone 1) of the SococoHQ virtual area that is located at the location SococoHQ/Zone1, as indicated in the location bar 316. This address indicates that Zone 1 is a zone within the area SococoHQ.

Each of the communicants who is present in the virtual area is represented graphically by a respective avatar that corresponds to the communicant's avatar that is shown in the people panel 265. The virtual area is represented graphically by a two-dimensional top view of a rectangular space. In some examples, the communicants' sprites automatically are positioned in predetermined locations (or "seats") in the virtual area when the communicants initially enter the virtual area.

The virtual area includes four view screen props 388, 390, 392, 394 and a table prop 396. Communicants interact with the props by selecting them with an input device (e.g., by single-clicking on the props with a computer mouse, touch pad, touch screen, or the like). The view screen props 388-394 are associated with application sharing functionality of the platform that enables communicants to share applications operating their respective client network nodes. The view screen props 388-394 are associated with application sharing functionality of the platform that enables communicants to share applications operating on their respective client network nodes. The application sharing functionality is invoked by activating a view screen prop (e.g., by single-clicking the view screen prop with an input device). In some embodiments, the platform provides visual cues that indicate whether or not a communicant is sharing an application over an application sharing channel. In response to a communicant's selection of the view screen prop, the communicant's sprite automatically is moved to a position in the graphical representation of the virtual area that is adjacent the view screen prop. The position of a communicant's sprite adjacent the view screen prop indicates that the communicant currently is sharing or is about to share an application with the other communicants in the virtual area. In addition, the avatar of each communicant who is viewing a shared application (including the sharing communicant) is depicted with a pair of "eyes" to indicate that the represented communicants are viewing the content being shared in connection with the view screen prop (see, e.g., the avatars of Beth and Dan in FIG. 4). The graphical depiction of a view screen prop is changed depending on whether or not an active application sharing session is occurring. For example, the depicted color of the view screen object prop change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

Any of the viewscreen props 388-394 may be associated with respective uniform resource identifiers (URIs) of network resources (e.g., network services) to enable communicants to interact with and share information associated with the network resources in connection with the viewscreen objects as described in U.S. patent application Ser. No. 13/399,737, filed Feb. 17, 2012.

The table prop 396 is associated with file share functionality of the platform that enables communicants to upload computer data files to server storage in association with the virtual area and to download data files that are associated with the virtual area from the server storage to the respective client network nodes. In example shown in FIG. 4, there are two document objects 398, 400 that are associated with the table prop 396. The document objects 398, 400 are linked to respective documents that are have been shared in the virtual area and stored in server storage. Any of the document objects 398, 400 may be selected by a communicant (e.g., by double-clicking the document object 398 with an input device, such as a computer mouse) to initiate downloading of the associated document to the communicant's client network node. Additional details regarding the structure, function, and operation of the table prop 396 may be obtained from U.S. patent application Ser. No. 12/354,709, filed Jan. 15, 2009.

In the Map view mode, the navigational controls of the graphical user interface 270 allow the user to traverse a path through the virtual environment in accordance with a navigational model that is tied to the underlying spatial hierarchy of virtual area locations and objects (e.g., props) within the locations. The network infrastructure service environment records the path traversed by the user. In some embodiments, the network infrastructure service environment records a history that includes a temporally ordered list of views of the virtual area locations that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view. The back button 369 corresponds to a backward control that enables the user to incrementally move backward to preceding ones of the zones in the history of the zones that were traversed by the user. The forward button 371 corresponds to a forward control that enables the user to incrementally move forward to successive ones of the zones in the history of the zones that were traversed by the user. Some examples additionally include a placemarks button that activates a placemarking control for storing links to zones and a placemark navigation control for viewing a list of links to previously placemarked zones. In response to user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations (showing, e.g., where communicants are located and visual cues of their realtime activities) of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area of the graphical user interface 270. Some examples include home button corresponds to a control that returns the user to a view of a designated "home" location in the virtual environment. Additional details regarding the structure, function, and operation of examples of the navigation controls are described in U.S. patent application Ser. No. 12/354,709, filed Jan. 15, 2009.

Figure 5:
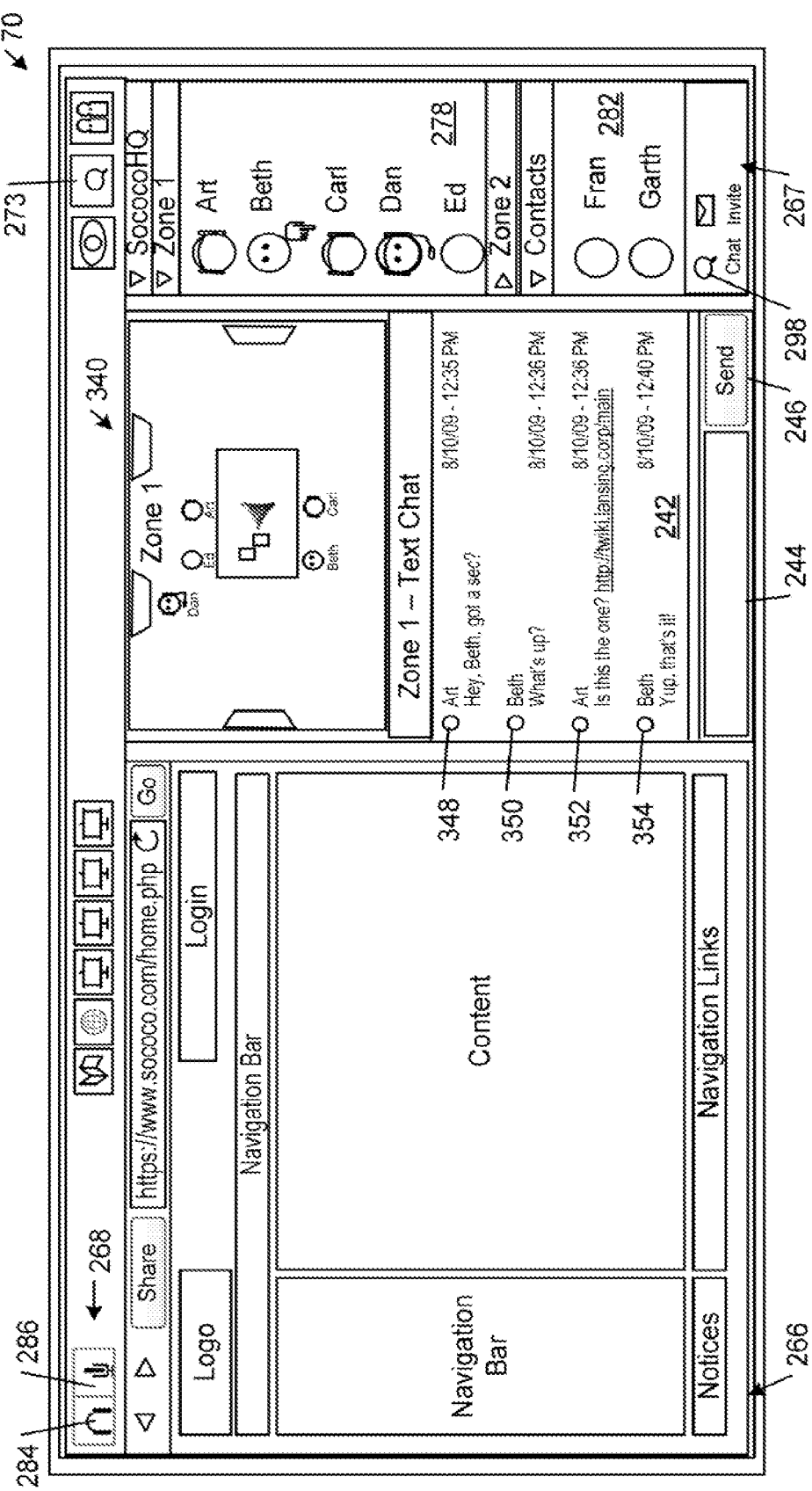

FIG. 5 shows an example of the graphical user interface 270 when the people panel 265 is open, a chat panel 402 is open, and the viewer panel 266 is open in the browser mode.

Activating the chat panel button 273 or the chat button 298 opens the chat panel 340. When the chat panel button 273 is activated, the chat panel 340 opens to show a chat interface for a persistent virtual chat area for interactions occurring in connection with a respective virtual area. In the example shown in FIG. 5, Art activated the chat panel button 273 at the time he was present in Zone 1; therefore, the chat panel 340 shown in FIG. 5 contains the persistent virtual chat area for text chat interactions occurring in connection with Zone 1. When the chat button 298 is activated, on the other hand, the chat panel 340 opens to show a chat interface for a persistent personal virtual area for interactions between Art and a selected one of the communicants. Examples of personal virtual areas are described in U.S. patent application Ser. No. 12/509,658, filed Jul. 27, 2009.

The chat interface of the chat panel 340 includes a chat log area 342, a text box 344, and a Send button 346. The chat panel 340 also includes a minimap view of the current zone (i.e., Zone 1 of the SococoHQ virtual area) in which the user is present.

The user may enter text messages in the text box 244 and transmit the text messages to the other communicants who are in the same zone by selecting the Send button 246. The chat log area 242 displays a log of current and optionally prior events that are associated with the user's current zone of presence (i.e., Zone 1 of the SococoHQ area application). An exemplary set of events that may be displayed in the chat log area 242 include: text messages that the user has exchanged with other communicants in Zone 1; changes in the presence status of communicants in Zone 1; changes in the speaker and microphone settings of the communicants in the Application 1; and the status of the props (discussed below), including references to any applications and data files that are shared in connection with the props. In the illustrated embodiments, the events are labeled by the communicant's name followed by content associated with the event (e.g., a text message) or a description of the event.

The chat panel 340 provides a context for organizing the presentation of the events that are displayed in the chat log area 242. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 348, 350, 352, 354 with a visual appearance (e.g., color-code, or design pattern) that matches the visual appearance of that communicant's sprite. In this example, the color of the icons 348, 352 matches the color of the body of Art's sprite, and the color of the icon 350, 354 matches the color of the body of Beth's sprite.

In addition to the functionality described above, the network infrastructure service environment also administers a capabilities based management system that support the creation of a wide variety of different virtual area configurations that can define permission rules in terms of communicant capabilities at a highly granular level to provide highly customizable virtual area based realtime communication environments.

Figure 6:
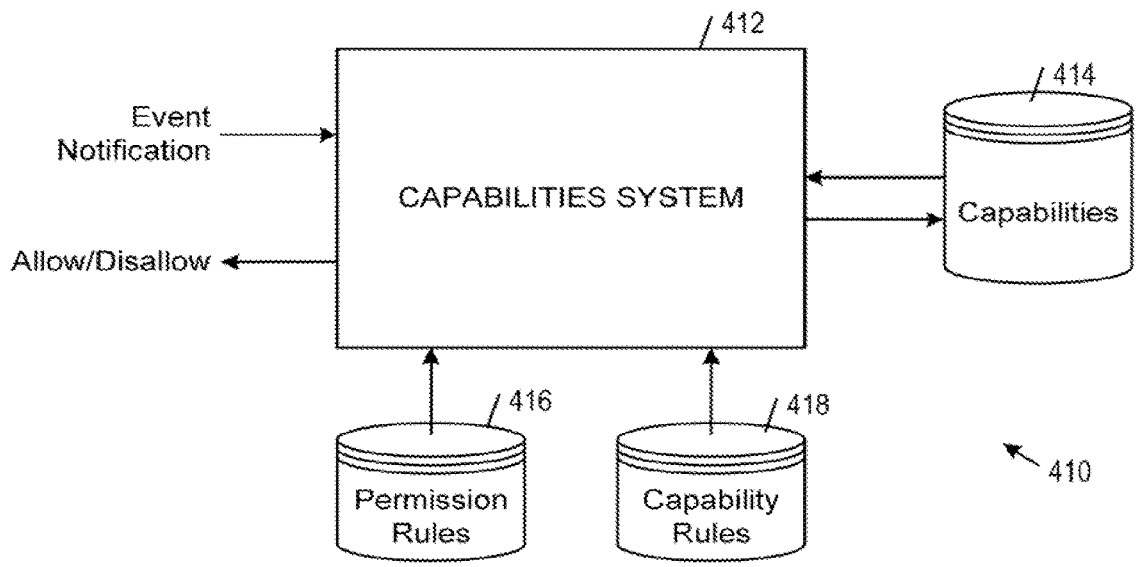
FIG. 6 is a block diagram of an example of a capabilities system.

FIG. 6 shows an example of a capabilities system 410 that includes a capabilities system 412, respective sets of capabilities 414 that are maintained by the capabilities system 412 for the communicants who access the network communication environment, a set of permission rules 416, and a set of capability rules 418.

Capabilities 414 are permissions for any of a variety of actions, behaviors, or states of, for example, network entities, such as client nodes and server nodes, or virtual entities such as virtual areas or virtual objects in the virtual areas. Capabilities may be transient (e.g., do not persist across sessions) or persistent (e.g., persist across sessions). In some examples, a capability has a set of attribute fields, including a capability identifier attribute field containing an identifier that identifies the capability, a grantee identifier attribute field containing an identifier that identifies a respective one of the communicants who is granted the capability, a target identifier attribute field containing a value for identifying one or more objects with respect to which the capability is applicable, and possibly other attribute fields (e.g., a grantor identifier attribute field that identifies the source of the capability grant, e.g., another communicant or a zone). Examples of capabilities include a CanEnterZone capability that relates to the ability of a grantee communicant to enter a target zone of a virtual area; a CanOpenDoor capability that relates to the ability of a grantee communicant to open a door object of a target room in a virtual area; a HasOwnershipPrivileges capability that relates to one or more abilities of a grantee communicant to interact with a target room object in a virtual area; and a CanSeeState capability that relates to the ability of a target communicant to see the state of a target communicant's avatar in a zone.

A permission rule 416 defines a respective capability requirement (e.g., for a respective action, behavior, or state) in terms of one or more capabilities, attributes, and settings. Examples of permission rules include: a rule that conditions a communicant's ability to enter a target zone on the communicant having a CanEnterZone capability for the target zone; a rule that conditions the ability of a grantee communicant to open a target door of a target room on the grantee communicant having a CanOpenDoor capability for the target room; and a rule that conditions the transmission of a message describing the state of a particular communicant's avatar in a zone to a recipient having a CanSeeState capability for the particular communicant in the zone.

A capability rule defines an action with respect to a capability contingent at least in part on a respective context, which may be defined by one or more capabilities, states (i.e., a collection of one or more attributes), and settings. Examples of such actions include granting a capability, revoking a capability, and suspending a capability. In general, changes in a communicant's set of capabilities can be triggered in a wide variety of different ways based on a wide variety of different factors, which can exist alone or be combined in a given capability rule. Examples of such factors include:

1. a role that is assigned to the communicant and is associated with a capability rule that grants or revokes a bundle of capabilities;
2. an action that results in a grant or revocation of a capability (e.g., a policy rule that confers to a calling communicant the grant to see the callee communicants phone number after the calling communicant calls the callee communicant);
3. one or more attributes or properties of a zone;
4. one or more attributes or properties (e.g., state or presence) of a communicant (e.g., a grantee or a zone owner)
5. a policy of an area application (e.g., a policy rule set by an area moderator that grants to all communicants present in a zone of the area the capability to view the phone logs associated with the zone);
6. a feature provisioned by an area application (e.g., a rule that grants to one or more communicants who are present in a zone the ability to make phone calls in response to the purchase of a phone-out provisioned feature for the zone); and
7. a capability (e.g., if a user has capability A, the user gets capability B in some context—for example if a user has CanMakePurchases, the user automatically gets CanRechargePhoneAccount).

Examples of capability rules include: granting a CanEnterZone capability to a grantee communicant with a HasOwnershipPrivileges capability that encompasses the target zone; revoking a CanEnterZone capability of a grantee communicant in response to the failure of the grantee communicant to use the capability within a specified period; and granting a CanEnterZone capability for a target zone to a grantee communicant who has a HasMemberPrivileges capability and the state of the door of the zone is open.

The following XML defines a set of exemplary capability grant rules:

```
<a:CapabilityGrant
ForZoneOFPresence="Any"
ForProvisionedFeature="Feature/AnyMemberCanPlaceCall"
ForRole="Role/AreaMember"
GrantName="Capability/CanPlaceCall"
GrantTarget="$ZoneId;"/>
```

This capability grant rule grants to a communicant who has a role of AreaMember a transient CanPlaceCall capability for a target ZoneId.

```
<a:CapabilityGrant
ForZoneOFPresence="Any"
ForPropertyName="DoorState"
ForPropertyValue="open"
ForRole="Role/AreaMember"
GrantName="Capability/CanEnterZone"
GrantTarget="$ZoneId;"
ClientVisible="true"/>
```

This capability grant rule grants to a communicant who has a role of AreaMember a transient CanEnterZone capability for a target ZoneId when the DoorState property of the ZoneId is open.

```
<a:CapabilityGrant
ForZoneOfPresence="Any"
ForCapability="Capability/HasZoneOwnership"
ForCapabilityTarget="$ZoneId;"
GrantName="Capability/CanManipulateDoor"
GrantTarget="$ZoneId;"
ClientVisible="true"/>
```

This capability grant rule grants a CanManipulateDoor capability for a target ZoneId to a communicant who has a HasZoneOwnership capability for the target ZoneId.

```
<a:CapabilityGrant
    ForZoneOFPresence="Any"
    ForCapability="Capability/HasZoneOwnership"
    ForCapabilityTarget="$ZoneId;"
    GrantName="Capability/CanEnterZone"
    GrantTarget="$ZoneId;"
    ClientVisible="true"/>
```

This capability grant rule grants a CanEnterZone capability for a target ZoneId to a communicant who has a HasZoneOwnership capability for the target ZoneId.

```
<a:CapabilityGrant
    ForZoneOFPresence="$ZoneId;"
    ForRole="Role/AreaMember"
    GrantName="Capability/CanManipulateDoor"
    GrantTarget="$ZoneId;"
    ClientVisible="true"/>
```

This capability grant rule grants to a communicant who has a role of AreaMember a transient CanManipulateDoor capability for a target ZoneId while the communicant is present in the target ZoneId.

```
<a:CapabilityGrant
    ForZoneOFPresence="$ZoneId;"
    ForRole="Role/AreaMember"
    GrantName="Capability/CanGrantAccess"
    GrantTarget="$ZoneId;"
    ClientVisible="true"/>
```

This capability grant rule grants to a communicant who has a role of AreaMember a transient CanGrantAccess capability for a target ZoneId while the communicant is present in the target ZoneId.

In operation, the capabilities system 412 applies the permission rules 416 and the capability rules 418 in response to events (e.g., events relating to actions, behaviors, or states) in a virtual area. In some examples, the capabilities system 412 subscribes to state change event notifications (e.g., notifications of headphones turned on, doors opened, communicants' avatars moved, etc.). When notified of a state change event, the capabilities system 412 determines if any of the permission rules 416 are applicable to the state change and, if so, performs a permissions check against the current set of capabilities 414 to determine whether or not the proposed state change event is allowable. If the current state change is allowed, the capabilities system 412 determines whether any of the capability rules 418 require one or more capabilities to be changed (e.g., granted or revoked) as a result of the state change.

Figure 7:
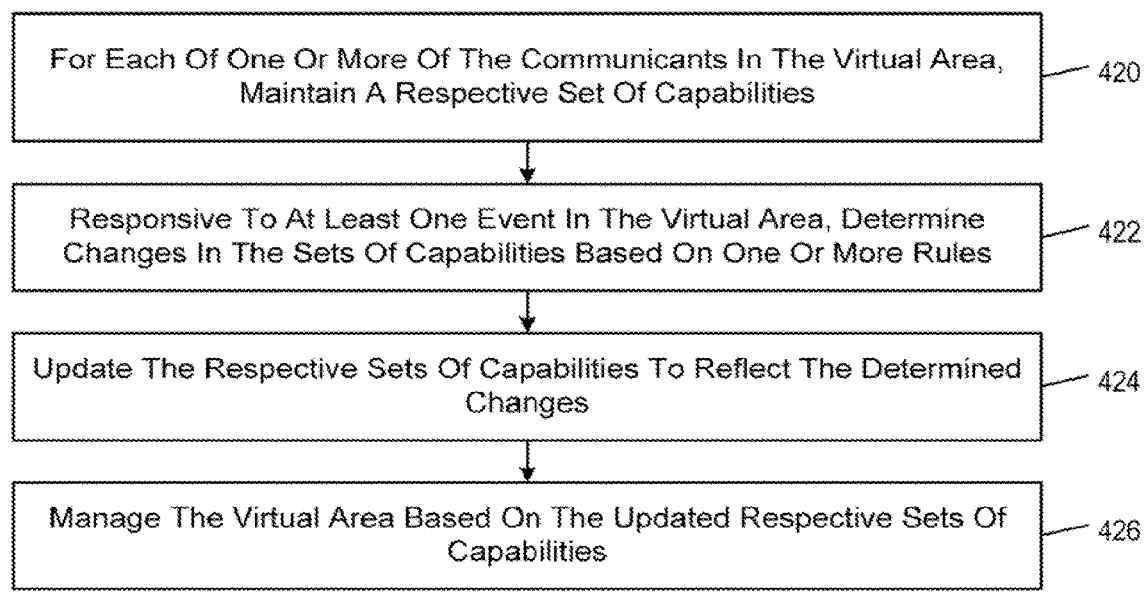

FIG. 7 shows an example of a method by which the capabilities system 412 manages and uses the capabilities 414 in connection with a virtual area. In accordance with this method, for each of one or more of the communicants, the capabilities system 412 maintains a respective set of capabilities (FIG. 7, block 420). Responsive to at least one event in the virtual area, the capabilities system 412 determines changes in the sets of capabilities based on one or more rules (FIG. 7, block 422). The capabilities system 412 updates the respective sets of capabilities to reflect the determined changes (FIG. 7, block 424). The capabilities system 412 manages the virtual area based on the updated respective sets of capabilities (FIG. 7, block 426).

In some examples, the capabilities system 412 determines the capability changes responsive to at least one change in state of at least one of the objects in the virtual area, and determines changes in the sets of capabilities based on one or more rules that depend at least in part on the state of the at least one object. The change in the state may include a change in at least one attribute of the at least one object. In some examples, the capabilities system 412 determines the capability changes responsive to a notification of a change in the state of the at least one object.

In some examples, the process of determining the capability changes involves identifying capability rules that are associated with the at least one change in state. The capability rules typically define an action with respect to a respective capability contingent at least in part on a respective context of the at least one change in state. For example, a capability rule may define an action granting the respective capability to a communicant contingent on the respective context or an action revoking the respective capability to a communicant contingent on the respective context. At least one of the capability rules may define the respective action to be contingent at least in part on one or more attributes of one or more objects in the virtual area. For example, at least one of the capability rules may define the respective action to be contingent at least in part on one or more of a presence attribute of an avatar object in the virtual area, a role attribute of an avatar object in the virtual area, an attribute of a room object in the virtual area, and an attribute of a door object in the virtual area. At least one of the capability rules may define a grant of the respective capability that expires in response to occurrence of a particular condition (e.g., an expiration of a specified period).

In some examples, at least one of the capability rules may define the respective action with respect to a respective capability that relates to a communicant interaction with a target object in the virtual area. For example, the respective capability may relate to a communicant interaction with a door object in the virtual area or an avatar object in the virtual area.

In some examples, at least one of the capability rules defines the respective action with respect to a respective capability that permits a communicant to receive information associated with the virtual area. For example, the respective capability may relate to a communicant receiving information indicative of a target communicant's presence, state, or activity in the virtual area.

In some examples, the virtual area includes zones with respect to each of which respective ones of the communicants are able to establish a respective presence. In some of these examples, at least one of the capability rules defines the respective action with respect to the respective capability contingent at least in part on one or more attributes of one or more of the zones.

In some examples, the process of determining the capability changes involves determining changes in the sets of capabilities responsive to a change in a presence attribute value of a particular one of the communicants in the virtual area. In some of these examples, a particular one of the objects in a virtual area is associated with a particular rule that conditions grant of a capability to interact with the particular object on the particular communicant having a presence in a particular location in the virtual area. In response to a change in the presence of the particular communicant to the particular location, the capabilities system 412 ascertains the communicants in the virtual area who have been granted the capability to interact with the particular object as a result of the presence change, and updates the respective sets of interaction capabilities to reflect the ascertained grant of the capability to interact with the particular object. In some examples, the virtual area includes zones with respect to each of which respective ones of the communicants are able to establish a respective presence, the particular object is in a particular one of the zones of the virtual area, the particular communicant has a role as an owner of the particular zone, and the particular rule conditions the grant of the capability to interact with the particular object on the particular communicant being present in the particular zone. The particular rule may, for example, condition the grant of the capability to interact with the particular object to any communicants that are co-present with the particular communicant in the particular zone, and the particular object may be any object within the particular zone (e.g., a room object in the particular zone).

In some examples, the capabilities system 412 determines a change in the capabilities 414 of a grantee communicant responsive to an explicit action (e.g., an explicit capability grant or an explicit capability revocation) by another communicant. For example, the capabilities system 412 may grant a CanEnterZone capability targeting a particular zone to a grantee communicant in response to an affirmative response by a grantor communicant to a knock request by the grantee communicant. In another example, the capabilities system 412 may revoke a CanSendAudio capability of a grantee communicant in response to an instruction by a target communicant to prevent the grantee communicant from sending audio data streams to the target communicant.

FIG. 8 shows an example of a method by which the capabilities system 412 changes capabilities responsive to explicit actions by communicants with respect to other communicants. In accordance with this method, responsive to an action by a first one of the communicants involving a second one of the communicants, the capabilities system 412 identifies one of more permission rules associated with the action, each of one or more of the permissions rules defining a respective action with respect to at least one capability contingent on an associated set of one or more capability requirements (FIG. 8, block 428). Based at least in part on a determination that the respective set of capabilities of at least one of the first communicant and the second communicant meets the capability requirements associated with all the identified permission rules, the capabilities system 412 determines one or more changes in the at least one capability of the second communicant based on the identified permission rules (FIG. 8, block 430). The capabilities system 412 updates the respective set of capabilities of the second communicant to reflect the determined changes (FIG. 8, block 432).

In some examples, the virtual area includes a spatial arrangement of room objects associated with respective door objects, the action by the first communicant involves a grant of a capability to enter a particular one of the room objects by the first communicant to the second communicant, and the process of updating the capabilities involves granting the second communicant the capability to enter the particular room object based on a determination that the first communicant has a respective set of capabilities meeting the capability requirements of all the permission rules identified as being associated with the grant of the capability to enter the particular room object. In some of these examples, at least one of the permission rules identified as being associated with the grant of the capability to enter the particular room object conditions the granting of the capability to enter the particular room object on the first communicant being present in the particular room object. In response to a determination that the first communicant has a role attribute value indicating that the first communicant is an owner of the particular room object, the capabilities system 412 automatically grants to the first communicant a capability to grant to the second communicant the capability to enter the particular room object.

The capabilities system 412 may respond to a variety of different actions by the first communicant, including a request by the first communicant to "get" the second communicant into the particular room object, and a request by the first communicant to open a door for the second communicant in response a request (e.g., a "knock" request) by the second communicant to enter the particular room object. In some examples, the capabilities system 412 responds to a "get" command by a communicant who has a capability to grant access to a room (e.g., a communicant with the HasOwnershipPrivileges capability for the target room zone) by granting the second communicant a CanEnterZone capability for the target room zone. In some of these examples, the grant of the CanEnterZone capability expires after the expiration of a particular period (e.g., ten minutes). In some examples, the capabilities system 412 responds to a request by a communicant who has a capability to open a door for the second communicant (e.g., a communicant with the HasOwnershipPrivileges capability for the target room zone or a communicant who currently is occupying the target room zone) by granting the second communicant a CanEnterZone capability for the target room zone. In some of these examples, the grant of the CanEnterZone capability expires after the expiration of a particular period (e.g., fifteen seconds).

In some examples, the capabilities system 412 disallows the action by the first communicant responsive to a determination that the respective set of capabilities of at least one of the first communicant and the second communicant fails to meet the capability requirements associated with all the identified permission rules.

FIG. 9 shows an example of a method by which the capabilities system 412 manages a virtual area based on the capabilities 414. Responsive to an event in connection with the virtual area, the capabilities system 412 identifies one or more permission rules that are associated with the event, where at least one of the permission rules defines a respective response to a respective type of event based on an associated set of one or more capability requirements (FIG. 9, block 434). The capabilities system 412 evaluates each of the identified permission rules based on the associated set of capability requirements and respective ones of the capabilities (FIG. 9, block 436). The capabilities system 412 responds to the event based on the evaluation of the identified permission rules (FIG. 9, block 438).

In some examples, at least one of the permission rules allows a request to perform a respective action in a virtual area in connection with a particular one of the communicants contingent on the particular communicant having a respective set of capabilities meeting the associated set of capability requirements. In one example, at least one of the permission rules may allow the particular communicant to interact with an object in the virtual area contingent on the particular communicant having a respective set of capabilities meeting the associated set of capability requirements. In another example, at least one of the permission rules allows the particular communicant to receive information associated with the virtual area contingent on the particular communicant having a respective set of capabilities meeting the associated set of capability requirements.

In some examples, the process of evaluating the identified permission rules involves applying multiple ones of the identified permission rules to a context associated with the event, and determining whether or not to allow the event based on a combination of results of the applying.

FIG. 10 shows an example of a method by which the capabilities system 412 performs a permission check with respect to capabilities that have respective capability attribute fields, including a capability identifier capability attribute field containing an identifier that identifies the capability, a grantee identifier capability attribute field containing an identifier that identifies a respective one of the communicants who is granted the capability, and a target identifier capability attribute field containing a value for identifying one or more objects with respect to which the capability is applicable. In accordance with this method, the capabilities system 412 performs a permission check against the respective sets of capabilities based on a search query comprising a particular capability identifier, a target identifier search field, and a grantee identifier search field, where at least one of the target identifier search field and the grantee identifier search field contains a wildcard value that matches all possible identifier values in the corresponding capability attribute field (FIG. 10, block 440). The capabilities system 412 manages the virtual area based on results of the permission check (FIG. 10, block 442).

In some examples, the capabilities system 412 manages capabilities on behalf of the communicants through proxy objects (also referred to as "proxies") that hold the respective sets of capabilities for the communicants. In these examples, the respective sets of capabilities are never transferred to the client network nodes; instead, the capabilities remain on the sever where they are updated and used for permission checks.

FIG. 11 shows an example of a method by which the capabilities system 412 provides capabilities-based management of a virtual area. In accordance with this method, for each of one or more of the communicants in the virtual area, the capabilities system 412 maintains a respective proxy comprising a respective set of capabilities of the communicant (FIG. 11, block 444). The capabilities system 412 manages the virtual area based on the communicant's respective proxy without transmitting any of the capabilities of the communicant's respective proxy to the respective client network node being operated by the communicant (FIG. 11, block 446). Thus, a communicant never has possession of a capability that can simply be handed off to another communicant who could then use the capability by virtue of possessing it. As a result, this approach protects against security violations by those who would falsely claim to have possession of a particular capability.

In some examples, the process of maintaining the proxies involves, for each of one or more of the communicants in the virtual area, maintaining the respective proxy on a network node other than the respective client network node being operated by the communicant.

In some examples, the capabilities system 412 determines one or more changes in the sets of capabilities based on one or more rules. Each of one or more of the rules typically defines a respective action with respect to a respective one of the capabilities contingent at least in part on a respective context in the virtual area. At least one of the rules typically defines the respective action with respect to a respective capability that permits a communicant to interact with an object in the virtual area. In some examples, at least one of the rules defines the respective action with respect to a respective capability that permits a communicant to receive information associated with the virtual area. In some examples, each respective action includes one of a granting of the respective capability or a revoking of the respective capability. For each of the one or more capability rules, the respective context typically is defined by at least one of: an attribute of a communicant; a capability of a communicant; an attribute of the virtual area; a policy associated with the virtual area; an action performed by a communicant in the virtual area; and a functionality associated with the virtual area.

In some examples, the process of managing the virtual area involves granting a particular capability to a particular one of the communicants. After granting the capability, the capabilities system 412 receives from the respective client network node of the particular communicant a request to perform an action the availability of which is conditioned on the particular communicant having the particular capability. Responsive to receipt of the request, the capabilities system 412 verifies that the particular communicant has the particular capability. After the verification, the capabilities system 412 allows the action to be performed responsive to a determination that the particular communicant has the particular capability, and disallows the action to be performed responsive to a determination that the particular communicant fails to have the particular capability.

FIG. 12A shows an example of an area server 500 provides capabilities based management of a virtual area for a communicant operating a client network node 502. The area server 500 provides transport services 504 that support communications between the area server 500 and the client network node 502, and area services 506 that remotely manage communications between the client network node 502 and other client network nodes, remotely configure and execute stream processing engines on the client network node, and remotely control switching of realtime data streams in accordance with instructions defined in an area application 508. The area server 500 also provides a capabilities engine 510 that manages capabilities on behalf of the communicant.

In operation, the client network node 502 logs into the account service. The account service authenticates the client network node 502 and sends to the authenticated client network node 502 a definition of a session between the client network node 502 and the area server 500. The client network node 502 uses the session definition to send a login request 512 to the area server 500. After the session has been established, the area server 500 either enters the communicant into a preexisting virtual area or launches a new virtual area (e.g., if the communicant is the first one to enter the virtual area). The area server 500 launches a virtual area by calling an area application factory service 514, which parses a virtual area application 516 to create a virtual area representation 518. The virtual area representation includes a document object model (DOM) 520 that represents the current state of the virtual area, a client proxy 522 that represents the current state of the client network node 502, and a set of rules 524 that include permission rules and capability rules.

The area server 500 cooperates with the rendezvous service to administer the virtual area for realtime communications between communicants. The area server 500 receives object property change messages from client network node 502. The area server 500 updates the document object models (DOMs) for the changed objects based on the object property change messages, and distributes the updated DOMs to all the client network nodes that are connected to the virtual area. The area server 500 updates the document object model (DOM) associated with the Object_ID and distributes the updated DOM to all the client network nodes connected to the virtual area (e.g., being operated by a communicant who is present in the virtual area). In response to receipt of the DOM update message from the area server 500, each client network node updates the rendering of the object corresponding to the Object_ID to reflect the changes made to the DOM for that object.

After being created, the client proxy 522 sends to the capabilities engine 510 a request that causes the capabilities engine 510 to create a capability ring 526 for the communicant. The capability ring is an object (e.g., a JAVA object) that provides an interface between the client proxy 522 and the capabilities engine 510. The capabilities engine 510 creates and owns the capability ring 526, and the capability ring 526 acts a delegate of the capabilities engine 510. The capability engine 510 and the client proxy 522 both can update the capability ring 526 through a shared reference.

The capabilities engine 510 updates the capability ring 526 by sending to the capability ring 526 a notification to update its in-memory representation of the respective communicant's persistent capabilities in the persistent capabilities database 528. For example, if an external event causes a change in a particular capability that is stored in the persistent capabilities database 528, the persistent capabilities database 528 will notify the capabilities engine 510 of the database change, and the capabilities engine 510 will send a respective update notification to each of the capability rings that are subscribed to a particular set of capabilities.

The client proxy 522 manages the storage of transient capabilities in the capability ring 526 in response to the application of capability rules to events (e.g., state changes).

Thus, as shown in FIG. 12B, the capability ring 526 stores both an in-memory representation of a communicant's persistent capabilities that are stored in the persistent capabilities database 528 and the transient capabilities that are granted as a result of the application of capability rules to events. The transient capabilities that are stored in the capability ring 526 are not persisted to the persistent capabilities database 528. In some examples, a rule can cause a persistent capability to be granted to the communicant. In this case, the client proxy 522 would store the persistent capability in the capability ring 526 and, in response the capability ring 526 would notify the capabilities engine 510 to persist the persistent capability in the persistent capabilities database 528. The client proxy 522, the capability ring 526, and the transient capabilities stored in the capability ring 526 typically exist only as long as the client-server session.

Most permissions checks are performed against the capability ring 526 through the client proxy 522. For these permission checks, the capabilities stored in the capability ring 526 are taken as the definitive set of capabilities for the particular communicant; there is no need to perform the check through the capability engine 510. By avoiding the need for database queries, these capability checks can be performed very quickly. This feature improves the responsiveness of the system when responding to requests from the client network node that require checks against the capability ring 526. The capabilities ring 526 also provides faster capabilities lookup performance relative to a database search by enabling the client proxy 522 to slice up the capabilities in the ring 522 based on the check that is being performed. In addition, the capabilities ring allows the client proxy 526 to resolve wildcarded attributes of the capabilities, where each wildcarded capability attribute matches all values for that attribute. In some cases, a communicant may have multiple capabilities of the same type but of different scope, and granted by different grantors. For example, a communicant may have a CanEnterZone capability that allows the communicant to enter any zone in SococoHQ and a CanEnterZone capability that allows the communicant to enter Bob's office in SococoHQ. In this example, the target identifier of the first CanEnterZone capability is wildcarded, whereas the target identifier of the second CanEnterZone capability identifies Bob's office. Both CanEnterZone capabilities allow the communicant to enter Bob's office, but only the first CanEnterZone capability allows the communicant to enter David's office.

The capabilities based management systems that are described herein support the creation of a wide variety of virtual area configurations for realtime communications. In this way, an area designer is able to optimize the behaviors of objects in a virtual area to serve a particular communication purpose, promote a particular policy, or create a particular communication environment (e.g., office, personal space, art gallery, concert hall, auditorium, conference room, and club house). The following examples are only a few of the wide variety of capability-based configurations that are possible.

Doors

In some examples, a virtual area includes a spatial arrangement of one or more rooms that are associated with respective door objects. A room is an object that has a respective set of properties (e.g., a label, whether it has a door, the style of the door such as auto-open and auto-close, and the door state). A door is an object that has a state and a style, which also are properties of the associated room. In some examples, a door can be in one of the following states and have one of the following styles:

Current State
1. open
2. closed
3. partially-open (ajar)

Style
1. always-closed (can't be opened)
2. always-open (can't be closed)
3. auto-close-occupancy (auto close when all occupants have left)
4. auto-open-occupancy (auto open when all occupants have left)
5. auto-open-onenter (when owner enters)
6. auto-close-onenter (when owner enters)

FIG. 13A shows an example of a graphical representation of a room 540 that is presented to communicants in the graphical user interfaces that are generated by the client communications applications operating on the client network nodes. The room 540 includes a door object 542. In FIG. 13A, the door object 542 is an open state. In FIG. 13B, the door object 542 is a closed state. In FIG. 13C, the door object 542 is a partially-open state. A communicant in the room can interact with the door object 542 (e.g., open or close the door) in a variety of ways. In some examples, a communicant in the room 540 can select the door (e.g., using an input device, such as a computer mouse) or can select the open or close door button in a toolbar of the user interface. When opening or closing the door 542, the client communications application is configured to play a specified sound effect, and the door animates open/closed in the user interface. In some examples, a graphic icon representing the state of door is presented in the navigation bar of the user interface. A message also may be printed into the chat log of the room (e.g., "DisplayName opened I closed the door to RoomName").

A virtual area application can be configured with one or more capability and permission rules that depend on or affect the state of one or more doors in the virtual area. These rules control how the area server dynamically updates communicant capabilities in response to changes in the states of objects in the virtual area, including the states of door objects and avatar objects. An area designer can tailor these rules to encourage or discourage certain behaviors. For example, an area moderator may configure the doors of communicant offices in a virtual area with an auto-open style in order to encourage communicants to talk more freely with one another. In some examples, doors to common locations (e.g., courtyards and lobbies) don't have doors and are treated as always being open. Doors to shared rooms (e.g., conference rooms) have doors that automatically open when there are no occupants. Doors to privately owned rooms (e.g., offices) have doors that automatically close when there are no occupants. In some examples, office owners are allowed to define the default behavior for their offices when they enter. In some examples, doors to offices open automatically when an owner enters it to support an "open door" team culture. In some examples, members or moderators are allowed change the default door behavior to require a knock for a "closed door" team culture. Some exemplary areas include one or more shared rooms with multiple owners (e.g., Project Rooms) that close when there are no occupants. In some examples, one or more rooms have doors that can be partly open to provide more granular signaling of the communicants' state of mind (e.g., "You can come in if you have a good reason"). In terms of access control, the area server treats a partly open door as an open door.

In some examples, an area application may define capability and permission rules with respect to a CanOpenDoor capability and a CanCloseDoor capability. One or both of these capabilities may be granted to communicants on the basis of one or more of a role (e.g., owner, moderator, member, or guest), ownership of the containing zone, or current location.

In some examples, the area server determines changes in the respective sets of communicant capabilities based on one or more capability rules that are associated with the door objects in a virtual area.

For example, in some area configurations, a particular one of the door objects is associated with a particular rule that conditions grant of a capability to enter the associated particular room object on the state of the door object being open. In response to a change in a state of the particular door object from closed to open, the area server ascertains one or more of the communicants in the virtual area who is to be granted the capability to enter the particular room object as a result of the state change, and updates the respective sets of interaction capabilities to reflect the ascertained grant of the capability to enter the particular room object.

In some examples, the particular rule conditions the grant of the capability to enter the particular room to communicants who have a particular role attribute value, and the area server ascertains one or more of the communicants in the virtual area who have the particular role attribute value. In some of these examples, the particular rule conditions the grant of the capability to enter the particular room to one or more communicant who has an attribute value corresponding to a membership in a particular communicant group, and the area server ascertains one or more of the communicants in the virtual area who are members of the particular communicant group.

In some examples, a particular one of the door objects is associated with a particular rule that conditions grant of a capability to enter the associated particular room object on a particular one of the avatar objects having a particular state. In response to a change in a state of the particular avatar object to the particular state, the area server ascertains one or more of the communicants in the virtual area who is to be granted the capability to enter the particular room object as a result of the state change, and updates the respective sets of interaction capabilities to reflect the ascertained grant of the capability to enter the particular room object. In some of these examples, the particular rule conditions the grant of the capability to enter the particular room on the particular avatar object having a role attribute value indicating that the respective communicant is an owner of the particular room object. In some of these examples, the particular rule conditions grant of the capability to enter the particular room object on the particular avatar object having a role attribute value indicating the respective communicant is an owner of the particular room object and on the particular avatar object being present in the particular room. In some of these examples, the particular rule conditions the grant of the capability to enter the particular room to communicants who have a particular role attribute value, and the ascertaining comprises ascertaining one or more of the communicants in the virtual area who have the particular role attribute value. In some of these examples, the particular rule conditions the grant of the capability to enter the particular room on the particular avatar object being present in a particular location in the virtual area. In some of these examples, the particular rule conditions the grant of the capability to enter the particular room on the particular avatar object being present in the particular room.

In some examples, a particular one of the door objects is associated with a particular rule that conditions grant of a capability to enter the associated particular room object on the particular room object having a particular set of one or more attribute values. In response to a change in state of the particular room object to a state comprising the particular set of one or more attribute values, the area server ascertains one or more of the communicants in the virtual area who is to be granted the capability to enter the particular room object as a result of the state change, and updates the respective sets of interaction capabilities to reflect the ascertained grant of the capability to enter the particular room object. In some of these examples, the particular rule conditions grant of the capability to enter the particular room object on a value of an occupancy attribute of the particular room object, where the occupancy attribute value corresponds to a count of avatar objects that are present in the particular room object. In some of these examples, the particular rule restricts the grant of the capability to enter the particular room to communicants who have a particular role attribute value, and the ascertaining comprises ascertaining one or more of the communicants in the virtual area who have the particular role attribute value.

In some examples, a particular one of the door objects is associated with a particular rule that conditions grant of a capability to enter the associated particular room object on the particular avatar object of at least one of the communicants having a particular state. In response to a change in a state of the particular avatar object to the particular state, the area server ascertains one or more of the communicants in the virtual area who is to be granted the capability to enter the particular room object as a result of the state change, and updates the respective sets of interaction capabilities to reflect the ascertained grant of the capability to enter the particular room object.

In some examples, a particular one of the door objects is associated with a particular rule that requires the particular door object to be in a particular state upon occurrence of a particular event and, in response to a determination that the particular event has occurred, the area server sets the state of the particular door object to the particular state. In some of these examples, the particular rule prescribes that the particular door object be in a closed state in response to a change in a state of the associated room object from occupied to unoccupied. In some examples, the particular rule prescribes that the particular door object be in an open state in response to a change in a state of the associated room object from occupied to unoccupied. In some examples, the particular rule prescribes that requires the particular door object to be in a closed state in response to a change in a state of a communicant who has a role as an owner of the associated room object from a state of non-presence in the associated room object to a state of presence in the associated room object. In some examples, the particular rule requires the particular door object to be in an open state in response to a change in a state of a communicant who has a role as an owner of the associated room object from a state of non-presence in the associated room object to a state of presence in the associated room object.

In some examples, a particular one of the door objects is associated with a particular rule that grants of a capability to manipulate the particular door object to a communicant in the virtual area conditioned on the respective avatar object of the communicant being present in a particular location in the virtual area. In response to a change in the presence of one or more of the avatars to the particular location in the virtual area, the area server ascertains one or more of the communicants in the virtual area who have been granted the capability to manipulate the particular door object as a result of the state change, and updates the respective sets of interaction capabilities to reflect the ascertained grant of the capability to manipulate the particular door object. In some examples, the particular rule conditions grant of the capability to manipulate the particular door object on the communicant being present in the particular room object.

In one exemplary area design, permission rules are defined to achieve the following door behaviors:

User Clicks a Door

| Door is . . . | Clicking user is in the room | Clicking user is outside the room Room has occupants | Room has no occupants |
| --- | --- | --- | --- |
| Open | Close the door | Knock | Attempt to enter |
| Closed | Open the door | Knock | Attempt to enter |

User Attempts to Enter the Room (by any Means)

| Door is . . . | Clicking user is outside the room |
| --- | --- |
| Open | Move the user into the room |
| Closed | If the user has the capability to enter the room, move the use into the room<br>If the user does not have the capability to enter the room:<br>if there are occupants, open the Knock dialog.<br>if there are no occupants, display a notification informing the user that they can't come in. |

Thus, if a communicant is in a room, clicking the door toggles the open/closed state. If the user is outside the room, clicking the door knocks on it, provided there is an occupant in the room to send the knock request to. In some examples, the user knocks even if the door is open. If a user outside a room clicks on the room's door or attempts to enter a room with a closed door, a knock window is opened if there is an occupant in the room to send the knock request to.

FIG. 14 shows an example of a method by which the area server administers an area configured with the door behaviors defined in the two preceding tables. In accordance with this method, a communicant requests to enter the room by clicking on the door with a user input device (e.g., a computer mouse) (FIG. 14, block 544). If the communicant has the CanEnterRoom for a target zone that encompasses the room (FIG. 14, block 546), the area server allows the communicant to enter the room (FIG. 14, block 548). If the communicant does not have the CanEnterRoom capability (FIG. 14, block 546), the area server checks to see if the room is occupied (FIG. 14, block 550). If the room is occupied (FIG. 14, block 550), the area server converts the room enter request to a knock request (FIG. 14, block 552). If the door of the room is opened by one of the occupants of the room within a prescribed period (FIG. 14, block 554), the area server allows the communicant to enter the room (FIG. 14, block 548); otherwise, the area server does not allow the communicant to enter the room (FIG. 14, block 556). If the room is not occupied (FIG. 14, block 550), the area server does not allow the communicant to enter the room (FIG. 14, block 556).

In some examples in accordance with the method of FIG. 14, when a communicant outside a room with a closed door attempts to enter the room (clicks the label or double-clicks the room) or clicks the door, a dialog appears letting the user input a message for the occupants of the room, and upon selection of a send request, the message is sent to the occupants of the room. When a communicant knocks, a sound effect typically is played for the sender and the occupants of the room and the occupants of the room get a sticky notification containing the contents of the Knock message with an Allow Entry and Reply button. If an occupant Allows Entry or Opens the Door within the "Pull Window" (an N-second time window, e.g., fifteen seconds), the occupant is "Pulled" into the room automatically. The knocking communicant then sees communicant's avatar moving into the room and a notification, similar to "DisplayName has granted access to Room Name" with the standard timeout. If an occupant Allows Entry or Opens the Door within the "Get Window" (an T-minute window, e.g., ten minutes) the occupant receives a notification similar to a Get notification, e.g., "DisplayName has granted access to Room Name" with a Go and a Reply button. After the "Get Window" times out, the Knock notification is dismissed.

In some examples of the method of FIG. 14, the area server identifies one or more permission rules that are associated with the respective door object associated with the particular room object responsive to a enter request by a particular one of the communicants to enter a particular one of the room objects. The area server allows the particular communicant to enter the particular room object based on a determination that the particular communicant has a respective set of capabilities meeting the capability requirements associated with all the identified permission rules. The area server changes the enter request into a knock request based on a determination that the particular communicant fails to have a respective set of capabilities meeting the capability requirements associated with all the identified permission rules, where the knock request requests an explicit grant of a capability to enter the particular room object from any one of the communicants who is present in the particular room object.

FIGS. 15A-15C show examples of dialog boxes 558, 560, 562 that are presented to communicants when a room enter request is converted into a knock request. The dialog box 558 is presented to the requesting communicant who is trying to enter the room without the required CanEnterZone capability. The dialog box 558 includes a user-configurable message (e.g., "May I enter Lakeview?") that is sent to each of the communicants occupying the room in response to the selection of a Knock button 564 by the requesting communicant. The message from the requesting communicant is presented to the communicants in the room in the dialog box 560, which includes an "Allow Entry" button 566 for allowing the requesting communicant to enter the room and a "Reply" button 568 for responding to the requesting communicant's request to enter with a message. The dialog box 562 is presented to the requesting communicant in response to the selection of the Allow Entry button 566 by any of the communicants in the room. The dialog box 562 includes a "Go" button 570 for moving the requesting communicant's avatar in to the room and a "Reply" button 572 for sending a message to the entry granting communicant in the room.

In some examples, an occupant of a room with a closed door can get another communicant into the room by sending a "get" message to the other communicant. In response to the occupant's request to transmit the "get" message to the other communicant, the area server grants to the other communicant a temporary CanEnterZone capability for the target room zone that expires after a "Get Window" period, and sends an instruction for the other communicant's client network node to generate a "get" dialog box for the other communicant. If the other communicant responds to the "get" message within the "Get Window", the other communicant's avatar is moved into the room even if the door is closed. If the other communicant responds to the "get" message after the expiration of the "Get Window", the other communicant is required to knock on the closed door because the other communicant's CanEnterZone capability for the target room zone has expired.

In some examples, although the capabilities themselves remain on the area server 500, the area server 500 does transmit to the client network node 502 a list of the capabilities that the communicant has in the current zone of presence. This information typically is transmitted to the client along with a zone definition record that includes a set of attributes of the current zone (e.g., the name of the zone, the channels that are published by the zone, and rendering properties of the zone). This information is used by the client application to configure the user interface (e.g., the navigation and/or interaction toolbar options). For example, in some examples, a zone owner may open the door of the zone, thereby changing the zone to a state that triggers the grant of a CanEnterZone capability to each communicant who is present in the zone. In this example, the area server 500 transmits to each of the client network nodes a respective zone definition record update that includes an indication that the communicant now has the CanEnterZone capability. The possession of this capability by the communicant will cause the client communications application to automatically move the communicant's avatar into the zone when the communicant clicks on the zone. In contrast, when the communicant does not have a CanEnterZone capability for a particular zone, the client communications application automatically presents the communicant with an option to knock on the particular zone when the communicant clicks on the door for the zone.

Thus, after the area server has transmitted a list of the respective communicant's current capabilities, the client application software will behave in accordance with those capabilities (e.g., automatically attempt to move the communicant's avatar into a room with a closed door). Due to network latency, however, the client software application may not be notified of a revocation of a previously granted capability before the communicant attempts to perform an action that requires that capability. In some examples, the area server is configured to resolve these potential conflicts by performing a second permission check on the actions that are attempted by the client application software. For example, if the client was informed that the user had the capability to enter room, but the room owner revoked the capability and the user attempted to enter before that state change was communicated to the client software application, the area server will check the proposed request to enter the room against the communicant's capability ring and reject the attempt to enter. The client software application receives a notification that the attempt to enter the room was denied and, in response, generates a dialog box prompting the communicant to send a knock request to enter the room. In addition to ensuring that behaviors in the virtual area conform to the expectations of the grantors of capabilities, this verification process also prevents rogue client network node from taking unpermitted actions by simply asserting that it has a particular capability.

In addition to doors of rooms, some or all of the doors related features and functionality described above also apply to other types of access control.

In some examples, the doors related features and functionality apply to drawers and other access control mechanisms. For example, access may be granted to a file cabinet conditioned on a communicant having a CanOpenFileCabinet capability. In this example, the CanOpenFileCabinet capability may be granted to a communicant who is co-present in the zone with the owner of the file cabinet.

In some examples the doors related features and functionality apply to ceilings over rooms that selectively block visibility access to the details of the contents and activities occurring in a particular room. In some of these examples, a communicant who has a CanSeeRoom capability can see the contents and activities occurring in a room; otherwise the communicant is only able to see a ceiling object over the room.

Capability-Based Object Modification

The capabilities-based management systems and methods described herein can be applied to the modification of objects in virtual areas.

U.S. patent application Ser. No. 13/399,737, filed Feb. 17, 2012, describes examples of the platform that enable a communicant to associate an object in the virtual area with a network resource, and maintains that association across sessions to provide virtual areas with persistent network resource associations that can be accessed immediately upon entry into the area. In these examples, an object (e.g., a view screen object) in a virtual area has a configurable uniform resource identifier (URI) property that a communicant can configure to associate a network resource with the object and thereby create "spatial bookmarks" for the network resources at the respective object locations in the virtual area. In this way, a communicant can customize a persistent virtual area with any type of network accessible resources to suit any particular purpose and then share the network resources with other communicants in the virtual area. For example, communicants can associate view screen objects in a virtual area with respective cloud-based services that relate to a particular project or business function (e.g., finance, accounting, software development, project management). The platform stores persistent records of the state of the virtual area, including the service associations with objects and the communicant interactions (e.g., chat, recordings, shared documents) that occurred in the virtual area so that each time the communicants enter the area they can continue where the left off with single-click access to the services that are relevant to the particular project of business function. Being able to place and keep services running in a virtual area means that meetings start with live application information (e.g., network resource information, stored documents, prior chat conversations, and recorded audio conversations) already in the room, and can restart where communicants left a discussion at the end of the previous meeting.

In some examples, the ability of a communicant to modify a particular object (e.g., change the web site linked to a view screen object) is conditioned on the communicant having a CanEditObject capability that targets the particular object. In some of these examples, this capability is granted based on at least one of the communicant's role (e.g., moderator), the communicant's current location of presence (e.g., in the conference room where the object is located), and the state of the object itself or another object (e.g., when a view screen is in an idle state).

Capability-Based Presentation of Information

The capabilities-based management systems and methods described herein can be applied to the presentation of information to communicants in virtual areas.

In some examples, the graphical user interface 270 that is generated by the communications application 26 includes a contacts section 282 that contains graphical representations (avatars) of all of a communicant's contacts who are not present in or not members of the current area (see FIG. 4). In some examples, the rendezvous service manages the presentation of contact information in the contacts section 282. In some of these examples, the rendezvous service enters the non-present, non-member contacts of all of the communicants who currently are in the area into a common non-spatial rendezvous zone, where a communicant's visibility into the rendezvous zone is controlled by capabilities. In this example, the non-present, non-member contacts log into the rendezvous service, establish a separate session with the rendezvous server, and have a presence in the rendezvous zone.

In non-rendezvous zones, the state and/or activity messages of communicants in the zones typically are broadcasted to all communicants in the virtual area. In the rendezvous zone, on the other hand, there is a capabilities check for state and/or activity messages (e.g., RDS state messages that show presence information and RDS Activity messages that show activity information, such as blinking hands when typing, etc). In particular, a contact's client network node broadcasts the contact's state and/or activity information in the rendezvous zone only to those recipient communicants in the virtual area who have the CanSeeState capability that targets that contact. For example, with reference to FIG. 4, Art's capabilities ring includes CanSeeState capabilities for Fran and Garth. As a result, the client network nodes of Fran and Garth broadcast state and/or activity messages to Art. The CanSeeState capability is persisted in the persistent capabilities database 528. Also, in contrast to some of the other capabilities described above, the CanSeeState capability is tied to a message rather than a zone or a function (e.g., the phone-out function).

In some examples, the state and/or activity messages additionally may be filtered according to membership. For example, members of the virtual area may be allowed to see the full state and/or activity information, whereas guests in the virtual may only be able to see where his or her contacts are (e.g., RDS state information), but not what his or her contacts are doing (e.g., RDS activity information).

U.S. patent application Ser. No. 13/165,729, filed Jun. 21, 2011, describes examples of the platform that provide virtual area based telephony systems and methods that enable a user of a Public Switched Telephone Network (PSTN) terminal device to participate in a virtual area based communications. Some examples enable the PSTN terminal device user to connect to audio data that is associated with a persistent virtual area. In this way, the PSTN terminal device user can participate in realtime communication sessions with other communicants in the virtual area, retrieve data that is stored in association with the virtual area, or store data in association with the virtual area. Some examples enable a communicant in a persistent virtual area to bring (or "get") a PSTN terminal device user into a virtual area based communication session simply by calling the PSTN terminal device. Some examples enable a PSTN terminal device user to establish a presence in or interaction with data associated a virtual area or a particular zone of a virtual by calling a telephone number associated with the virtual area or zone.

In some examples, the ability of communicants to see the phone out numbers for the callee communicants is conditioned on the communicants having CanSeePhoneNumber capabilities for the callee communicants. In these examples, a calling communicant can open up a phone list of anyone who is a member of the virtual area, but the communicant only can see the specific phone numbers of the callee communicants who have granted the calling communicant the capability of seeing their phone numbers. If the calling communicant does not have the CanSeePhoneNumber for a particular callee communicant, the calling communicant will be able to call the particular callee communicant, but the platform will not display the phone number of the callee communicant unless the calling communicant has the capability. The calling communicant can obtain this capability either by proving that the calling communicant knows it (e.g., dialing the number) or by explicitly being given the capability by the communicant assigned to the phone number. In some examples, a zone is associated with a capability rule that grants the CanSeePhoneNumber capability for a target communicant to a calling communicant in the zone who transmits the phone number of the target communicant to the phone-out function provisioned for the zone. From that point forward the calling communicant will be able to see that phone number in his or her phone records. The CanSeePhoneNumber capabilities are persisted in the persistent capabilities database 528.

III. CONCLUSION

Other embodiments are within the scope of the claims.

The invention claimed is:

1. A system that operates in a network communication environment in which communicants operating respective client nodes connect to an area in which ones of the communicants are able to establish respective presences, the system comprising:

a processor; and a memory, coupled to the processor, having code stored therein that when executed by the processor, the processor performs operations comprising:

executing an engine to manage capabilities on behalf of each of one or more of the communicants in the area, and provide for each communicant a respective capability ring that stores the communicant's persistent capabilities and transient capabilities that are granted as a result of applying capability rules to the communicant;

monitoring states of the area, wherein the area is defined with a current state of the area, and the current state comprises an occupancy attribute that provides an indication of occupancy of the communicants in the area;

dynamically updating the respective capability ring of the particular communicant based on changes in states of the communicants and the area, wherein the dynamically updating comprises based on a permissions check by the capabilities engine against the respective capability ring of the particular communicant, determining that the particular area is in a first state as defined by a first set of one or more values of the one or more attributes and automatically granting a respective transient capability to enter the particular area to the particular communicant, and based on a permissions check by the capabilities engine against the respective capability ring of the particular communicant, ascertaining that the particular area is in a second state as defined by a second set of one or more values of the one or more attributes in which the value of the occupancy attribute is different from the value of the occupancy attribute in the first state and automatically revoking the capability to enter the particular area from the particular communicant; and administering one or more of realtime communications between the client nodes of respective ones of the communicants who are co-present in the area.

2. The system of claim 1, wherein the occupancy attribute value corresponds to a count of the communicants who are present in the area.

3. The system of claim 2, wherein the first set of one or more values defining the first state of the area comprises an occupancy value greater than zero, and the second set of one or more values defining the second state of the area comprises an occupancy value of zero.

4. The system of claim 3, wherein the first set of one or more values comprises a particular role attribute value indicating membership in a particular group, and the respective capability to enter the area is automatically granted to the particular communicant who is associated with the particular role attribute value.

5. The system of claim 3, wherein the first set of one or more values comprises a particular role attribute value indicating membership in a particular group, and the automatically granting comprises automatically granting the respective capability to enter the area to the particular communicant without regard to membership in the particular group.

6. The system of claim 5, wherein the automatically revoking comprises:

responsive to a determination that occupancy in the virtual room by communicants who are not associated with the particular role attribute value is zero, automatically revoking the respective capability to enter the area from communicants who are not associated with the particular role attribute value.

7. The system of claim 2, wherein the first set of one or more values defining the first state of the area comprises an occupancy value of zero, and the second set of one or more values defining the second state of the area comprises an occupancy value greater than zero.

8. The system of claim 1, wherein the first set of one or more values comprises a particular value of a role attribute, and the automatically granting of the respective capability to enter the area is based on a particular one of the one or more communicants being associated with the particular value of the role attribute.

9. The system of claim 8, wherein the automatically granting of the respective capability to enter the area is responsive to the particular communicant occupying the area.

10. The system of claim 9, wherein the automatically revoking of the capability to enter the area is responsive to the particular communicant vacating the area.

11. The system of claim 9, wherein the particular value of the role attribute is an owner of the area.

12. The system of claim 1, wherein the first set of one or more values comprises a particular role attribute value, and the dynamically updating comprises automatically granting a respective capability to modify one or more attributes of the area to a particular communicant who is occupying the area and is not associated with the particular role attribute value; and further comprising allowing the particular communicant to modify the one or more attributes of the area conditioned on the particular communicant being present in the virtual room.

13. The system of claim 12, wherein the allowing is further conditioned on a communicant who is associated with the particular role attribute value being present in the area during the allowing.

14. The system of claim 12, wherein the particular role attribute value indicates ownership of the area.

15. The system of claim 12, wherein the particular role attribute value indicates membership in a group that is associated with the area.

16. The system of claim 12, wherein the allowing comprises allowing the particular communicant to modify the state of the area from a locked state to an unlocked state.

17. A non-transitory, computer readable medium that includes code that is executable by a computer system that operates in a network communication environment in which communicants operating respective client nodes connect to an area in which ones of the communicants are able to establish respective presences, wherein execution of the code by the computer system causes the computer system to perform operations comprising:

executing an engine to manage capabilities on behalf of the communicants in the area, and provide for each communicant a respective capability ring that stores the communicant's persistent capabilities and transient capabilities that are granted as a result of applying capability rules to the communicant;

monitoring states of the area, wherein the area is defined with a current state of the area, and the current state comprises an occupancy attribute that provides an indication of occupancy of the communicants in the area;

dynamically updating the respective capability ring of the particular communicant based on changes in states of the communicants and the area, wherein the dynamically updating comprises based on a permissions check by the capabilities engine against the respective capability ring of the particular communicant, determining that the particular area is in a first state as defined by a first set of one or more values of the one or more attributes and automatically granting a respective transient capability to enter the particular area to the particular communicant, and based on a permissions check by the capabilities engine against the respective capability ring of the particular communicant, ascertaining that the particular area is in a second state as defined by a second set of one or more values of the one or more attributes in which the value of the occupancy attribute is different from the value of the occupancy attribute in the first state and automatically revoking the capability to enter the particular area from the particular communicant; and administering one or more of realtime communications between the client nodes of respective ones of the communicants who are co-present in the area.

18. The non-transitory, computer readable medium of claim 17, wherein the occupancy attribute value corresponds to a count of the communicants who are present in the area.

19. The non-transitory, computer readable medium of claim 18, wherein the first set of one or more values defining the first state of the area comprises an occupancy value greater than zero, and the second set of one or more values defining the second state of the area comprises an occupancy value of zero.

20. The non-transitory, computer readable medium of claim 19, wherein the first set of one or more values comprises a particular role attribute value indicating membership in a particular group, and the respective capability to enter the area is automatically granted to the particular communicant who is associated with the particular role attribute value.

21. The non-transitory, computer readable medium of claim 19, wherein the first set of one or more values comprises a particular role attribute value indicating membership in a particular group, and the automatically granting comprises automatically granting the respective capability to enter the area to the particular communicant without regard to membership in the particular group.

22. The non-transitory, computer readable medium of claim 21, wherein the automatically revoking comprises:
responsive to a determination that occupancy in the virtual room by communicants who are not associated with the particular role attribute value is zero, automatically revoking the respective capability to enter the area from communicants who are not associated with the particular role attribute value.

23. The non-transitory, computer readable medium of claim 18, wherein the first set of one or more values defining the first state of the area comprises an occupancy value of zero, and the second set of one or more values defining the second state of the area comprises an occupancy value greater than zero.

24. The non-transitory, computer readable medium of claim 17, wherein the first set of one or more values comprises a particular value of a role attribute, and the automatically granting of the respective capability to enter the area is based on a particular one of the one or more communicants being associated with the particular value of the role attribute.

25. The non-transitory, computer readable medium of claim 24, wherein the automatically granting of the respective capability to enter the area is responsive to the particular communicant occupying the area.

26. The non-transitory, computer readable medium of claim 25, wherein the automatically revoking of the capability to enter the area is responsive to the particular communicant vacating the area.

27. The non-transitory, computer readable medium of claim 25, wherein the particular value of the role attribute is an owner of the area.

28. The non-transitory, computer readable medium of claim 17, wherein the first set of one or more values comprises a particular role attribute value, and the dynamically updating comprises automatically granting a respective capability to modify one or more attributes of the area to a particular communicant who is occupying the area and is not associated with the particular role attribute value; and further comprising allowing the particular communicant to modify the one or more attributes of the area conditioned on the particular communicant being present in the virtual room.

29. The non-transitory, computer readable medium of claim 28, wherein the allowing is further conditioned on a communicant who is associated with the particular role attribute value being present in the area during the allowing.

30. The non-transitory, computer readable medium of claim 28, wherein the particular role attribute value indicates ownership of the area.

31. The non-transitory, computer readable medium of claim 28, wherein the particular role attribute value indicates membership in a group that is associated with the area.

32. The non-transitory, computer readable medium of claim 28, wherein the allowing comprises allowing the particular communicant to modify the state of the area from a locked state to an unlocked state.

* * * * *